United States Patent
Pandey et al.

(10) Patent No.: US 12,079,608 B2
(45) Date of Patent: Sep. 3, 2024

(54) EFFICIENT OPTIMIZATION FOR NEURAL NETWORK DEPLOYMENT AND EXECUTION

(71) Applicant: Cypress Semiconductor Corporation, San Jose, CA (US)

(72) Inventors: Ashutosh Pandey, Irvine, CA (US); Kaiping Li, Randolph, NJ (US); Vikram Kumar Ramanna, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 405 days.

(21) Appl. No.: 17/513,679

(22) Filed: Oct. 28, 2021

(65) Prior Publication Data
US 2022/0303176 A1   Sep. 22, 2022

Related U.S. Application Data

(60) Provisional application No. 63/160,072, filed on Mar. 12, 2021.

(51) Int. Cl.
*G06F 9/50* (2006.01)
*G06F 8/41* (2018.01)

(52) U.S. Cl.
CPC .......... *G06F 8/447* (2013.01); *G06F 9/5016* (2013.01); *G06F 9/5038* (2013.01)

(58) Field of Classification Search
CPC .................................. G06F 9/5038
See application file for complete search history.

(56) References Cited

U.S. PATENT DOCUMENTS

| | | | |
|---|---|---|---|
| 6,625,797 B1 * | 9/2003 | Edwards | G06F 30/30 716/132 |
| 2020/0160175 A1 * | 5/2020 | Vahdat | G06N 3/045 |

* cited by examiner

*Primary Examiner* — Charlie Sun

(57) ABSTRACT

Implementations disclosed describe methods and systems to perform the methods of deploying and executing machine learning models on target-specific computational platforms. Optimization techniques include but are not limited to alignment of kernel operations with hardware instructions of a target processing device, reduction of kernel dimensions near boundaries of data, efficient reuse of a small number of memory components during neural network operations, run-time quantization of data and neural network parameters, and other methods.

20 Claims, 12 Drawing Sheets

EFFICIENT OPTIMIZATION FOR NEURAL NETWORK DEPLOYMENT AND EXECUTION

RELATED APPLICATIONS

This application claims the benefit of U.S. Provisional Application No. 63/160,072, filed Mar. 12, 2021, the entire contents of which is being incorporated herein by reference.

TECHNICAL FIELD

The instant disclosure pertains to provisioning efficient computational support of machine learning models; more specifically, to optimizing use of memory and computational resources for efficient deployment of machine learning models on devices having particular hardware configurations.

BACKGROUND

Edge computing is a type of a distributed computing in a cloud-based or server-based computing environment, where at least a portion of data processing occurs closer to a periphery of the environment where collection or consumption of data takes place. An edge device can be a computing device of relatively modest processing and memory capabilities and can have access to local data (e.g., via connected sensory devices, an Internet-of-Things, or IoT, network) and to a cloud service. Instead of uploading local data as input into the cloud service and then receiving a processing output from the cloud service, the edge device can in some instances process the local data using its own processor and memory resources. Even though the cloud service can be capable of processing the local data faster than the edge device, limitations of the network bandwidth can negate cloud processing gains. Local processing can have additional advantages, such as responding in real-time to changing conditions, reducing the computational load of the cloud service, decreasing network traffic, eliminating exposure of sensitive data to adversarial attacks, and so on.

DETAILED DESCRIPTION

Figure 1A:
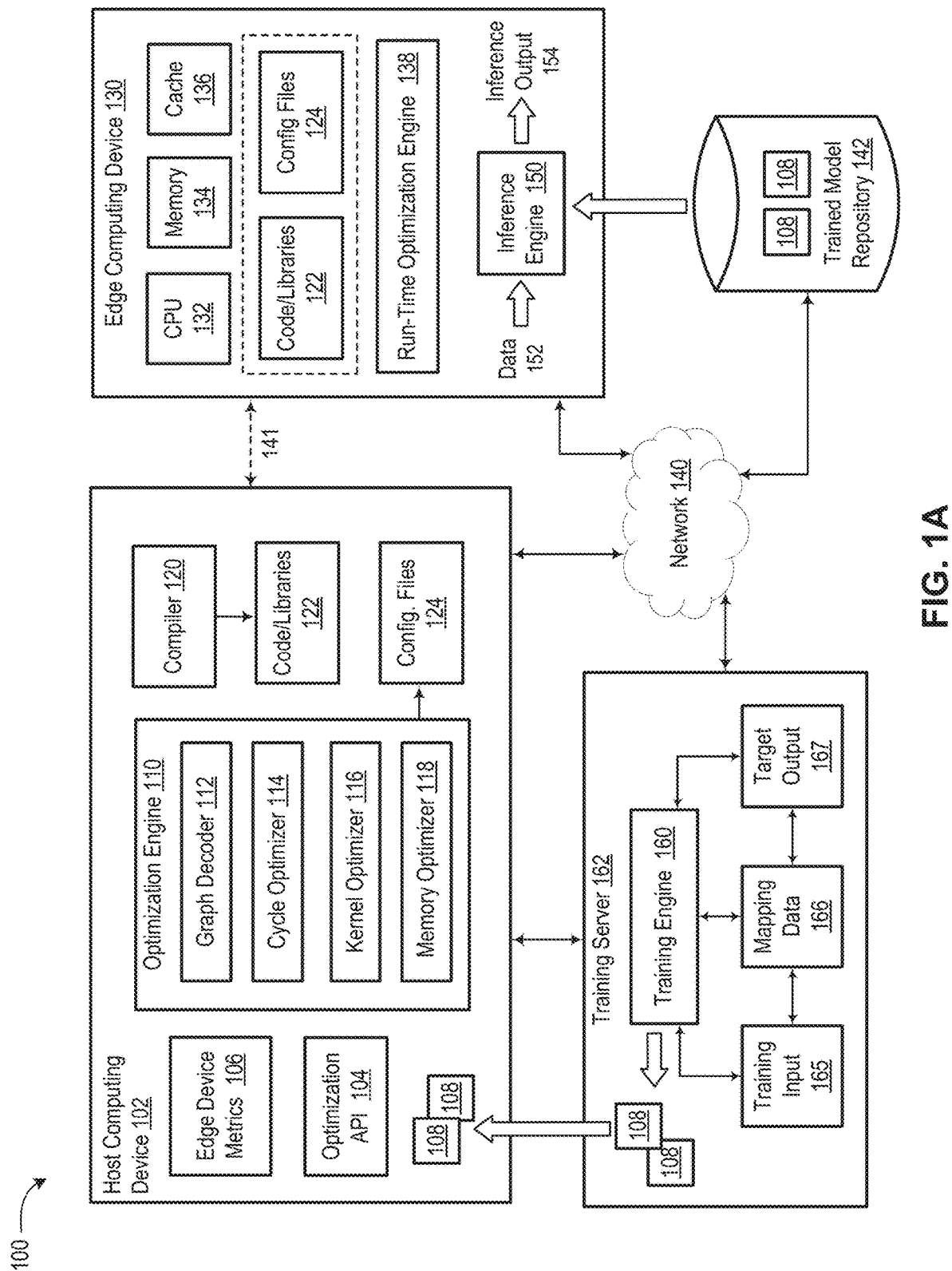
FIG. 1A is a block diagram of an example architecture of a computing environment that supports analyzing, optimizing, and deploying of one or more machine learning models on target-specific platforms, in accordance with some implementations of the present disclosure.

Modern networks may connect together computing devices of very diverse processing capabilities. For example, a technological (e.g., manufacturing) line may include hundreds (or more) of wireless sensors connected to a local area network (LAN) and/or a personal area network (PAN). Groups of sensors may be served by a local (edge) processing device, such as a microcontroller unit (MCU). Multiple MCUs may be connected to a local processing device, e.g., a workstation, which in turn may be communicating with a corporate data center and/or a cloud service supported by a super-computing facility. In some instances, one or more processing devices in this processing hierarchy may be executing machine learning algorithms, e.g., as part of environmental monitoring, quality control of input materials, product yield quality control, and so on. Machine learning models (MLMs) may be developed and trained on one type of computing devices (e.g., high-power computers) but deployed on a different type of computing devices (e.g., low-power MCUs).

An edge device may have a limited amount of memory to store trained MLMs and a limited-speed processor to execute stored MLMs. A trained MLM, such as a neural network (NN), may have a large number of neurons, arranged in layers, each neuron associated with a set of weights and a bias. Weights and biases of a NN may be stored in the memory together with the input data, intermediate data (outputs of various neuron layers), output data, and the like. The processor of an edge device may be capable of executing a limited number of threads and operations per unit of time. As a result, execution of a NN trained on a high-end processing device may be suboptimal when performed on an edge device.

Aspects and implementations of the present disclosure address these and other limitations of the existing technology by enabling systems and methods that facilitate deployment of machine-learning models on processing device with specific computing resources, including but not limited to edge devices. For brevity, a deployment platform is often referred herein as edge device, but it should be understood that various implementations and optimization techniques disclosed herein may be used on computers that have substantial processing and memory resources, including server computing devices, cloud computing devices, and the like. Disclosed implementations allow deployment of MLMs on device-specific target platforms. Disclosed implementations include an optimization engine (OE) that analyzes an architecture of a NN to be deployed, referred herein to as a NN graph, determines an optimized way in which the NN is to be executed using device-specific computational resources, and compiles executable files for the deployment of the NN on the target platform. In some implementations, the OE may compile the executable files in view of various lower-level optimizations described herein.

In one instance, the lower-level optimizations may include optimizations of computational cycles. For example, OE may identify a platform-specific Instructure Set Architecture (ISA), which may include vectorized instructions (VIs) supported by a processor (e.g., MCU) of the edge device, and modify various NN kernels (filters) to have a size that corresponds to the size of VIs. For example, if a first kernel has a size that is less than the size of the VIs, the first kernel may be padded (e.g., with zeros) to take advantage of the ISA of the edge device. Similarly, if a second kernel has a size that exceeds the size of the VIs, the second kernel may be divided between two (or more) VIs, with padding added to one (or more) of the divided kernels, as necessary to fit the second kernel into an integer number of VIs. In some instances, e.g., if the last divided kernel has only a few operations, the OE may not perform padding of the last divided kernel, if doing so would take more cycles than it takes to compute the unpadded kernel. Optimization of computational cycles may further include reducing the size of kernels where the kernels operate on inputs of reduced number of input values. For example, a kernel operating near a boundary of the NN graph may be transformed into a partial kernel, for faster computations.

In another instance, the lower-level optimization may include optimization of the memory use. For example, a portion of memory may be allocated to store intermediate outputs of NN layers and may further be split into a first portion and a second portion. A first portion may store intermediate outputs of a first layer, a third layer, and other odd layers of the NN. A second portion may store intermediate outputs of a second layer, a fourth layer, and other even layers of the NN. As processing moves to a layer of a different parity (e.g., from odd to even and back to odd) intermediate outputs are stored in a respective (first or second) portion while the other portion (second or first) is used as input data. As another example, a single memory portion may be used that is large enough to store intermediate outputs of two consecutive NN layers with different regions of the portion storing outputs of the two NN layers and being overwritten with data from subsequent layers when outputs of the earlier rounds are no longer needed. As another example, outputs of layers that implement local processing, e.g., pooling layers, convolutional layers, may be stored in memory portions that are overwritten once an input element in a relevant locale has been processed.

In another instance, a NN that is too big to fit into available cache memory may be partitioned into a number of smaller regions, with NN parameters (e.g., weights, biases, activation functions) of a specific region loaded into the cache memory for regional processing, being replaced (e.g., on a continuous basis) with NN parameters of the next region once particular NN parameters of the current regions are no longer needed.

In another instance, some of the optimization operations may be performed on the edge device during real-time inference processing. For example, quantization (e.g., rescaling to integer values) of input data and NN parameters may be implemented dynamically for efficient processing, e.g., responsive to real-time collection of statistics for the input data. Various other optimization techniques and variation of the above techniques are disclosed herein.

FIG. 1A is a block diagram of an example architecture of a computing environment 100 that supports analyzing, optimizing, and deploying of one or more machine learning models on target-specific platforms, in accordance with some implementations of the present disclosure. As depicted in FIG. 1A, computing environment 100 may include a host computing device 102. Host computing device 102 is depicted as a single block, but it should be understood that any components of host computing device 102 may be implemented on (or shared among) any number of computing devices and/or on a cloud. Host computing device 102 may be a desktop computer, a laptop computer, a smartphone, a tablet computer, a server, a computing device that accesses a remote server, a computing device that utilizes a virtualized computing environment, a gaming console, a wearable computer, a smart TV, and so on. A user of host computing device 102 may have a local or remote (e.g., over a network) access to host computing device 102. Host computing device 102 may have (not shown in FIG. 1A) any number of central processing units (CPUs) and graphical processing units (GPUs), including virtual CPUs and/or virtual GPUs, or any other suitable processing devices capable of performing the techniques described herein. Host computing device 102 may further have (not shown in FIG. 1A) any number of memory devices, network controllers, peripheral devices, and the like. Peripheral devices may include various sensing devices, photographic cameras, video cameras, microphones, scanners, or any other devices for data intake. Computing environment 100 may also include an edge computing device 130 interactively coupled to host computing device 102, e.g., via a network 140 or a direct connection 141. Edge computing device 130 may be implementing one or more MLM that may be optimized by host computing device 102.

In some implementations, a host computing device 102 may include a number of engines and components for efficient MLM optimization and deployment. Interaction of host computing device 102 with edge computing device 130 may be facilitated by an optimization application programming interface (API) 104, which may facilitate collection of edge device metrics 106 associated with edge computing device 130. Collected edge device metrics 106 may include various data characterizing computational resources of edge computing device 130, such as a number and type(s) of CPU(s) 132, CPU(s) clock rate(s), number of hardware threads per CPU 132, size of data operands that can be processed by various hardware threads of CPU 132, size of available memory 134, cache (high-speed memory) 136, and the like. In some implementations, processing and memory resources of edge computing device 130 may be distributed among two or more separate devices connected via a local network (not shown). In such instances, edge device metrics 106 may further include network bandwidth of the local network, throughput, latency, packet loss rate, and so on.

Figure 1B:
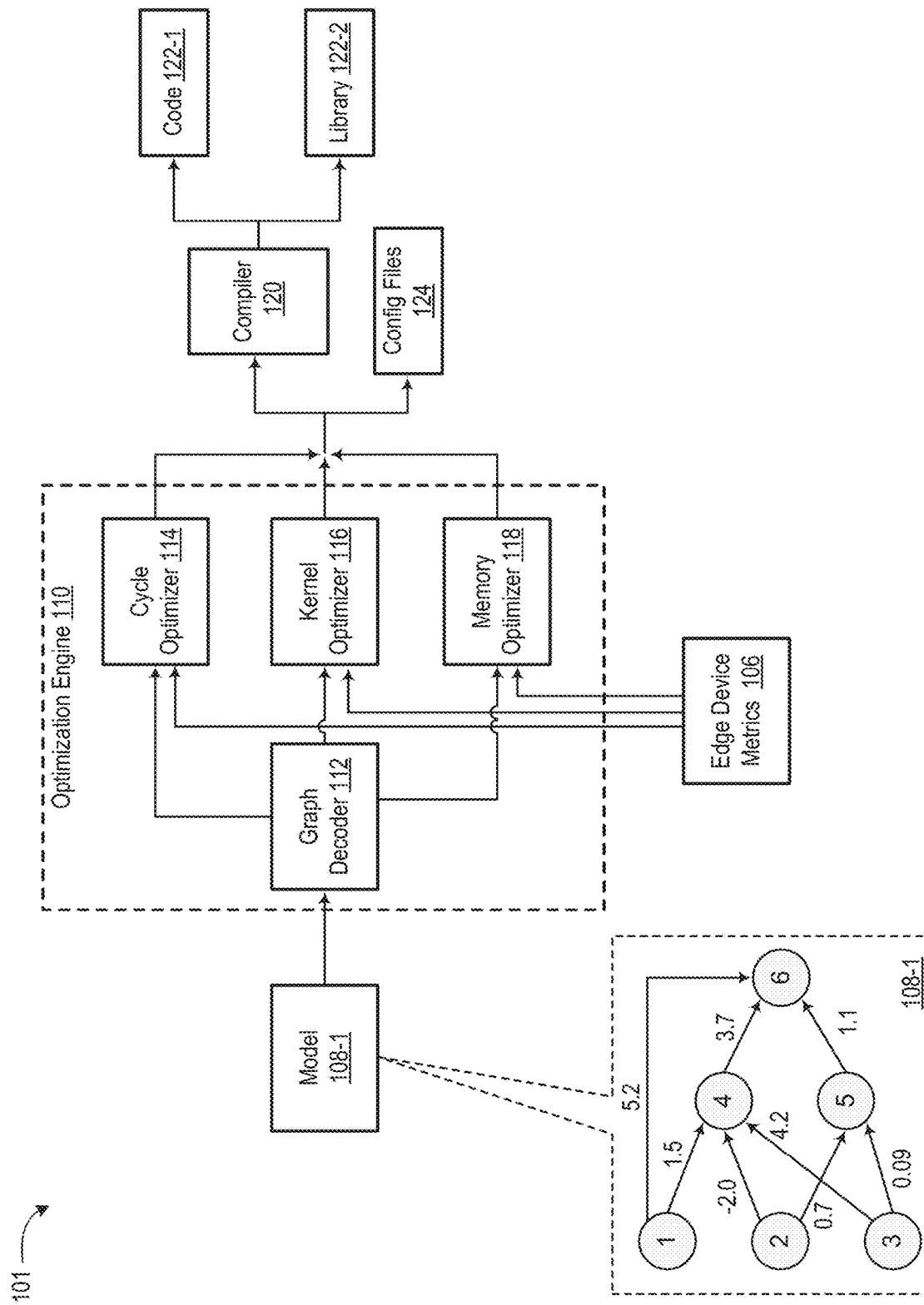
FIG. 1B illustrates operations of an optimization engine and compiler of the example architecture of FIG. 1A, in accordance with some implementations of the present disclosure

Optimization engine (OE) 110 may include a graph decoder 112, a cycle optimizer 114, a memory optimizer 118, and a kernel optimizer 116. OE 110 may have access to edge device metrics 106 and one or more trained MLMs 108. As described in more detail below, output of OE 110 may be used by a compiler 120 to compile an executable code and libraries 122 for target-specific execution of MLM 108. OE may also generate edge device configuration file(s) 124. FIG. 1B illustrates operations 101 of OE 110 and compiler 120 of the example architecture 100 of FIG. 1A, in accordance with some implementations of the present disclosure. As depicted in FIG. 1B, when a model 108-1 is being evaluated for deployment on edge computing device 130, graph decoder 112 may access architecture and parameters of model 108-1 (e.g., one of trained MLMs 108). For example, graph decoder 112 may determine a number of neural layers and number of neurons (computational nodes) of model 108-1, a number of incoming/outgoing neural connections (edges) for each node, weights associated with each edge, biases and activation functions associated with each node, and so on. A layer should be understood as any set of operations that may be performed in parallel. For example, operations performed on a set of input data (e.g., partitioned among multiple neurons) by various neurons may represent one layer, operations performed on the output of that layer may represent another layer, and so on. A neuron may represent any set of computations that takes two or more input numbers and produces an output number (e.g., via weight multiplication, bias addition, application of an activation function, etc.).

The graph information may be delivered to graph decoder 112 in any suitable form, e.g., as one or more tables, one or more graphs, arrays of values, and the like, or any combination thereof. In some implementations, NN graph information may include a matrix $\hat{M}$ of NN parameters, the matrix $\hat{M}$ having matrix elements $M_{jk}$. The dimension of the matrix $\hat{M}$ may be N×N, where N is the total number of nodes in the network. A non-zero off-diagonal matrix element $M_{jk}$ may indicate a weight of a neural connection directed from node j to node k. Correspondingly, the transposed NN matrix element $M_{kj}$ may indicate a weight of an inverse connection, from node k to node j. Feed-forward neural networks may, therefore, have at least N(N−1)/2 zero matrix elements. The diagonal matrix element $M_{jj}$ may indicate a bias value $b_j$ associated with node j. For example, a 5-node neural network depicted in FIG. 1B may be described with the following matrix $\hat{M}$:

$$\hat{M} = \begin{pmatrix} b_1 & 0 & 0 & 1.5 & 0 & 5.2 \\ 0 & b_2 & 0 & -2.0 & 0.7 & 0 \\ 0 & 0 & b_3 & 4.2 & 0.09 & 0 \\ 0 & 0 & 0 & b_4 & 0 & 3.7 \\ 0 & 0 & 0 & 0 & b_5 & 1.1 \\ 0 & 0 & 0 & 0 & 0 & b_6 \end{pmatrix},$$

in which off-diagonal elements of j-th column represent weights of edges directed into j-th node and off-diagonal elements of j-th row list weights of edges leaving the respective node. In some implementations, a sparse representation of matrix $\hat{M}$ may be used, in which only non-zero weights and biases are listed. Additionally, NN graph information may include listings of activation functions of each mode and, if applicable, parameters of the activation functions.

Based on the matrix $\hat{M}$ of NN parameters, graph decoder 112 may evaluate a number of computational cycles that is to be performed to process inference data by model 108-1 and estimate the data flows through model 108-1. For example, if an intermediate output of node j is $O_j$, k-th node may be performing an operation to produce an intermediate output that is equal to $O_k = \Sum_{j \neq k} O_j \cdot M_{jk} + b_k$. Based on the topology of model 108-1, e.g., as represented by matrix of NN parameters, graph decoding 112 may identify a number of computational cycles that may take to process each layer of neuron connections. Graph decoding 112 may also identify a number of memory operations (read and write operation) that are needed to process all intermediate neuron outputs and the type of memory addresses to store information (e.g., floating point, integer, single-precision, double-precision, and the like).

Graph decoding 112 may further determine, e.g., based on the matrix of NN parameters or any other suitable NN graph information, that at least some of the operations of the model 108-1 are to be performed using one or more kernels (filters). More specifically, a kernel may be a fixed-size sub-matrix $\hat{m}$ of weights (of the larger matrix $\hat{M}$) that is repeatedly applied (e.g., in a sliding fashion) to multiple outputs of a neuron layer (or input data). Multiple kernels may be used to collect context information output by various neuron layers. For example, an MLM used for object recognition may process a plurality of input pixels, each pixel associated with one (e.g., black/white) intensity value and/or multiple (e.g., Red/Green/Blue) color intensity values. A first neuron layer may apply a 3×3 kernel (or 5×5 kernel, or any other applicable kernel) to compute a weighted convolution of input pixel values and collect context information for a particular locale of the input pixel values. In some implementations, multiple kernels may be applied within a given layer of neurons, with one or more kernels of different sizes computing convolutions for different locales of the input data. For example, a first kernel having dimensions of 4×4 pixels and a second kernel having dimensions of 8×8 pixels may be applied to intensity pixel values. Additional kernels (e.g., 16×16 pixel kernels) may be similarly applied to color pixel values, and so on. Subsequent (e.g., second, third, etc.) layers of neurons may have additional kernels operating on outputs of previous neuron layers (herein referred to as intermediate outputs). Whereas some kernels may preserve dimensions of intermediate outputs, other kernels may reduce (or increase) the dimension of the intermediate outputs. For example, a maximum (or an average) pooling kernel of k×l dimension may determine a maximum (or an average) value in a locale of k×l values output by the preceding layer. Graph decoder 112 may identify all such kernels and evaluate a number of computational resources (processor cycles, memory size, and a number of memory operations) that is needed to execute an instance (e.g., processing of one set of inference data) of model 108-1.

As depicted in FIG. 1B, the output of graph decoding 112 may be used by a cycle optimizer 114, which may identify a format of hardware instructions that a processor or microcontroller (accelerator, co-processor, etc.) of the edge computing device 130 can be capable to execute. For example, cycle optimizer 114 can identify that CPU 132 is capable of performing vectorized instructions (VIs), e.g., as part of Instructure Set Architecture (ISA), implemented thereon.

VIs or any other suitable hardware instructions recognized by CPU 132 may enable fast parallel processing of operations of model 108-1, e.g., SIMD (Single Instruction, Multiple Data) processing. Additionally, unlike a conventional compiler, which imposes a data format (e.g., 8-bit char, 16-bit integer, 32-bit single-precision, 64-bit double-precision, etc.) that is determined by an application that is using model 108-1, cycle optimizer 114 may enforce the data format to be aligned with the format of VIs (or any other suitable hardware instructions) recognized by CPU 132.

More specifically, using cycle optimizer 114, compiler 120 may generate a code 122-1 for execution of model 108-1 on edge computing device 130 and may further generate one or more library files 122-2, with memory use in code 122-1 and library files 122-2 being aligned with ISA of CPU 132. For example, hardware instructions implementing parallel processing on CPU 132 may be operating on 32-bit inputs (operands). Code 122-1 may, therefore, assign input data starting memory addresses as used by hardware instructions of CPU 132. For example, if input data is in a 8-bit char format, code 122-1 may be configured to assign data starting address to a 32-bit address recognized by VIs of CPU 132.

In some implementations, cycle optimizer 114 may cause compiler 120 to change a format of some or all of the input data. For example, input data may be in a CHW format (e.g., color, height, width) whereas hardware instruction by CPU 132 may more efficiently handle data in a modified HWC (height, width, color) format.

Similarly, using kernel optimizer 116, compiler 120 may optimize execution of a model 108-1 that is trained to use kernels with dimensions that may not be aligned with a number of hardware threads of CPU 132. For example, hardware instructions of CPU 132 (or any other suitable processing unit not shown in FIG. 1A, such as a graphics processing unit, or GPU) may allow for sixteen multiplications to be performed in parallel. A first kernel deployed by model 108-1 may be a 4×3 kernel. The first kernel execution, therefore, may involve computing twelve multiplications involving portions of input data (or intermediate outputs of previous neuron layers) and twelve weights of the first kernel. To align kernel dimension with dimensions of CPU 132 parallel processing, code 122-1 may include padding operations to transform the 4×3 kernel to a 4×4 kernel, e.g., by adding another column with zero weights to the kernel. As another example, a second kernel deployed by model 108-1 may be a 6×4 kernel that has twenty four multiplications. To be aligned with the CPU 132 hardware instructions, the kernel may be padded to the 8×4 size (e.g., by adding two row of zero weights) and implementing one application of the kernel via two successive hardware instructions, each performing sixteen parallel multiplications.

In some instances, instead of padding kernels to higher dimensions, compiler 120 can use kernel optimizer 116 to reduce dimensions of some kernels, e.g., instances of kernels that are applied near an edge of model 108, as described in more detail below in conjunction with FIG. 2.

Using memory optimizer 118, compiler 120 may optimize memory utilization during execution of model 108-1 on edge computing device 130, as described in more detail below in conjunction with FIGS. 3A-C and FIG. 4. Memory optimizations may include (but not limited to) allocating memory buffers of a size sufficient to store outputs of one or two consecutive neuron layers, reusing memory portions once values stored therein have been processed, partitioning NN into a number of smaller regions, with the associated NN parameters loaded into cache 136 sequentially, and so on.

As depicted in FIG. 1B, output of compiler 120 may include a code 122-1, library 122-2. In some implementations, a library 122-2 may be a collection of routines and data that is not platform-specific. Configuration file(s) 124, generated by OE 110, may include settings and templates that are specific to the edge computing device 130. Configuration file(s) 124 may determine how execution of code 122-1 is to be implemented on edge computing device 130. Referring back to FIG. 1A, code 122-1, library 122-2, and configuration file(s) 124 may be passed to edge computing device 130 for execution by inference engine 150. In some implementations, configuration file 124 may be made available to a user (e.g., developer), via optimization API 104. Optimization API 104 may represent configurations of the compiled model 108 in a format that is accessible to the user. In some instances, optimization API 104 may indicate that execution of model 108-1 on edge computing device 130 may be sub-optimal. The user may then change the architecture of model 108-1 and/or initiate a retraining of model 108-1. For example, optimization API 104 may indicate to the user that a NN with a specific number of hidden layers will not be able to perform object recognition in real time. In response, the user (developer) may reduce the number of hidden layers (and/or a number of neurons in various layers) and retrain model 108-1 in the new configuration.

Training (and retraining) of models 108 may be performed by a training server 162. In some implementations, training server 162 may be a part of host computing device 102. In other implementations, training server 162 may be communicatively coupled to host computing device 102 directly or via network 140. Training server 162 may be (and/or include) a rackmount server, a router computer, a personal computer, a laptop computer, a tablet computer, a desktop computer, a media center, or any combination thereof. Training server 162 may include a training engine 160. During training (or retraining), training engine 160 may generate and configure one or more MLMs 108. MLMs 108 may include regression algorithms, decision trees, support vector machines, K-means clustering models, neural networks, or any other machine learning algorithms. Neural network MLMs may include convolutional, recurrent, fully connected, Long Short-Term Memory models, Hopfield, Boltzmann, or any other types of neural networks. Generating MLMs may include setting up an MLM type (e.g., a neural network), architecture, a number of layers of neurons, types of connections between the layers (e.g., fully connected, convolutional, deconvolutional, etc.), the number of nodes within each layer, types of activation functions used in various layers/nodes of the network, types of loss functions used in training of the network, and so on. Generating MLMs 108 may include setting (e.g., randomly) initial parameters (weights, biases) of various nodes of the networks. The generated MLMs may be trained by training engine 160 using training data that may include training input(s) 165 and corresponding target output(s) 167. Association of training input(s) 165 with correct target output(s) 167 may be identified by mapping data 166. During training of MLMs 108, training engine 160 may identify patterns in training input(s) 165 based on desired target output(s) 167 and train the respective MLMs to perform the desired tasks. Trained MLMs 108 may then be validated using additional training (validation) input/target output associations not previously seen by MLMs 108.

Trained (and retrained) MLMs 108 may be stored in a trained model repository 142, which may be accessible to host computing device 102 and edge computing device 130. In some implementations, after optimization and compiling of model 108 is performed for edge computing device 130 (e.g., by host computing device 102), corresponding code 122-1, libraries 122-2, and configuration file(s) 124 may be stored in trained model repository and accessed (e.g., downloaded) by edge computing device 130 at or prior to running one or MLMs 108. Trained model parameters (weights and biases) may be converted or transformed to another data format (e.g. quantized fixed-point format) and may be stored inside edge computing device 130. Trained model repository 142 may be a persistent storage capable of storing trained MLMs 108. Trained model repository 142 may be hosted by one or more storage devices, such as main memory, magnetic or optical storage based disks, tapes or hard drives, NAS, SAN, and so forth. Although depicted as separate from training server 162, in some implementations, trained model repository 142 may be a part of training server 162. In some implementations, trained model repository 142 may be a network-attached file server, while in other implementations, trained model repository 142 may be some other type of persistent storage such as an object-oriented database, a relational database, and so forth, that can be hosted by a server machine or one or more different machines accessible to the training server 162 via network 140.

In an example deployment scenario, one or more of MLMs 108 (e.g., model 108-1) may be trained on training server 162 and provided to host computing device 102 for optimization and compiling for a target-specific platform, e.g., for the edge computing device 130. Trained model parameters, code 122-1, libraries 122-2, and configuration file(s) 124 may then be provided to edge computing device 130. An inference engine 150 on edge computing device 130 may access configuration file(s) 124 and configure execution of code 122-1 using configuration settings in the configuration file(s) 124. Configuration settings may specify a size of the memory address to be used in execution of model 108, a size of data operands to be processed by CPU 132, kernel modifications (e.g., padding and/or reduction), handling of memory store and read operations, and various other optimizations operating in accordance with the present disclosure. Some of the optimizations, e.g., run-time data optimization (quantization) and kernel modification may be performed by run-time OE 138 operating on edge computing device 130. The deployed and optimized model 108-1 may be used by inference engine 150 to process application-specific (inference) data 152 and produce inference output 154. Inference output 154 may include any classification output of model 108, e.g., object recognition output, object type classification output, voice recognition output, speech recognition output, technological control output, security output, data handling output, or any other applicable output.

Various optimizations that may be used in deploying and executing model 108-1 will now be described in detail in relation to FIGS. 2-4 below. Although for specificity, the optimizations may be described as being performed on edge computing device 130, the same or similar techniques may also be used for optimization of MLM deployment on any other computing devices, including workstations, servers, cloud computers, and any other computing devices.

Figure 2:
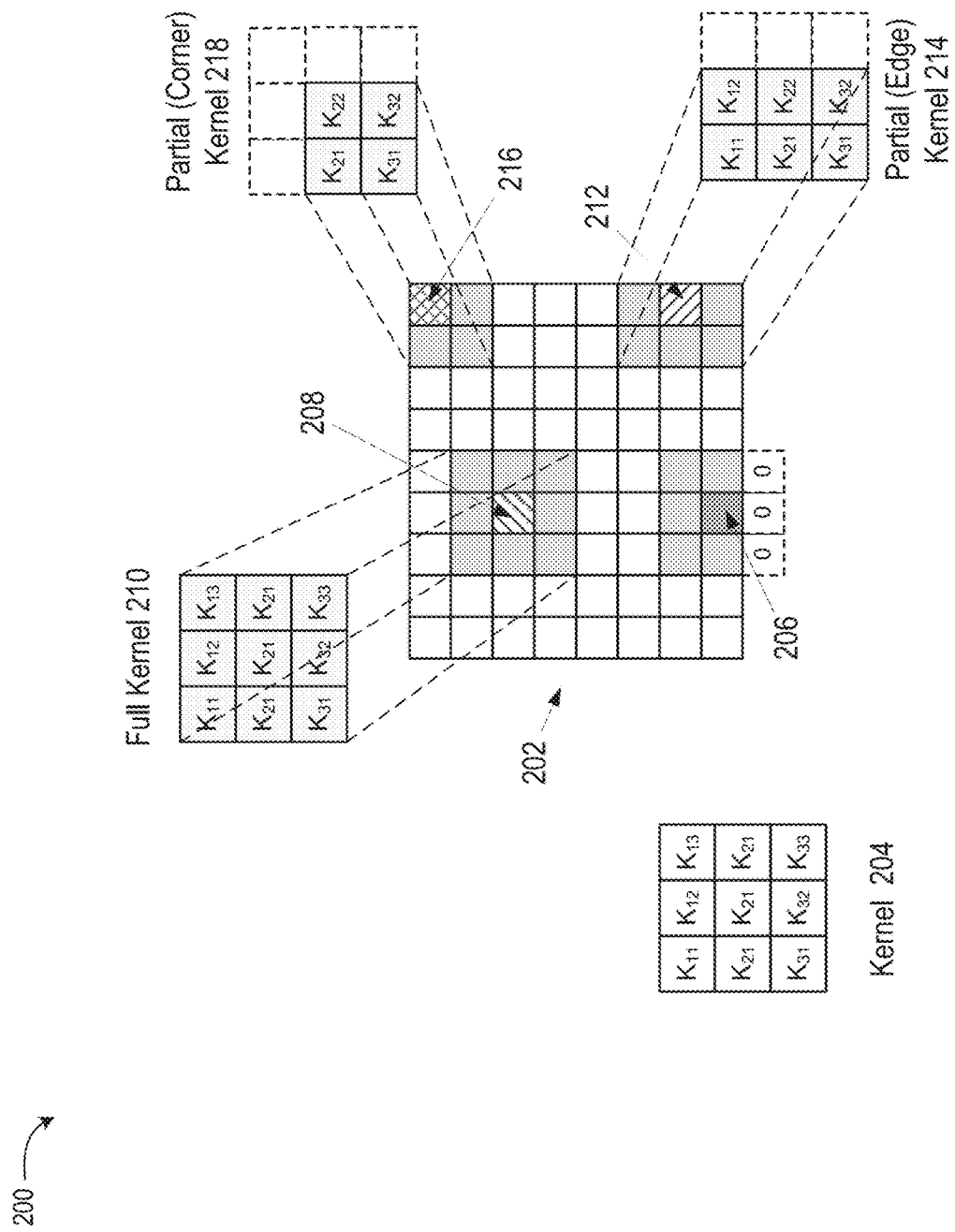
FIG. 2 is a schematic depiction of a kernel reduction for optimized execution of machine-learning models on target-specific platforms, in accordance with some implementations of the present disclosure.

FIG. 2 is a schematic depiction of a kernel reduction 200 for optimized execution of machine-learning models on target-specific platforms, in accordance with some implementations of the present disclosure. An input data into a layer of a NN model is depicted schematically via a data grid 202, each cell of the grid representing an element of data. Although a rectangular grid is shown for specificity, any other grid of input data may be processed similarly. The input data may refer to a portion of data 152 input into an MLM model or any portion of intermediate outputs of preceding layers of neurons. Data grid 202 may be processed with kernel 204, which may be represented by a matrix of elements $K_{jk}$. Shown is a 3×3 matrix, but matrix of any other dimensions may be used, depending on specific settings of a particular neuron layer. When kernel 204 is applied to a locale of data grid 202, kernels elements $K_{jk}$ are applied to (e.g., multiplied by) respective elements of data grid 202 and added together and the sum is used to produce (subject to adding a bias and applying an activation function) an element of the output of the neuron layer. In some instances, e.g., where the dimension of the layer output is the same as the dimension of the layer input, kernel 204 may be applied at a locale of grid 202 whose size is smaller than the size of kernel 204, e.g., at a point near a boundary of data grid 202. A conventional way of applying kernel 204 to a vicinity of an edge grid element 206 is to modify, e.g., by padding with zeros, the input data by expanding the input data beyond the data grid 202 and then applying kernel 204 to the expanded grid. Such a padding increases a number of multiplications that need to be performed to apply kernel 204 and further increases an amount of memory needed to store data grid 202.

In some implementations of this disclosure, a kernel reduction is performed for instances of kernel application near a boundary (e.g., edge or corner) of input data grid (or any intermediate data grid). More specifically, when kernel 204 is applied in the bulk of grid 202, e.g., to a vicinity of grid element 208, where kernel 204 does not cross any boundary of grid 202, a full (unmodified) kernel 210 may be used. When kernel 204 crosses the boundary, the size of the kernel may be reduced to obviate the need to store padding data and eliminate the corresponding multiplication operations. For example, when kernel 204 is applied near a vicinity of an edge element 212, a partial (edge) kernel 214, with the rightmost column eliminated, may be applied to the respective locale of edge element 212. Similarly, when kernel 204 is applied near a corner element 216, a partial (corner) kernel 218, with the rightmost column and the uppermost row eliminated, may be applied to the respective locale of corner element 216. Such kernel modification decreases a number of computational cycles that are used to process data grid 202 and the size of memory registers (e.g. cache or internal SRAM) needed to store data grid 202. The described techniques may be applied to grids of an arbitrary topology (e.g., other than rectangular) and kernels of arbitrary size and type, e.g., to convolutional kernels, deconvolutional kernels, pooling kernels, and so on. In some implementations, kernel reduction may be incorporated into code 122-1 by kernel optimizer 116 and compiler 120. In some implementations, kernel reduction may be performed by the run-time OE 138 keeping track of the size of a data locale to which a kernel is applied and selecting a corresponding portion of the kernel for application to the data. In some implementations, all reduced (e.g., edge and/or corner) kernels may be applied first as a batch, using reduced number of processing operations, followed by application of full kernels to the rest of the input data grid.

Figure 3A:
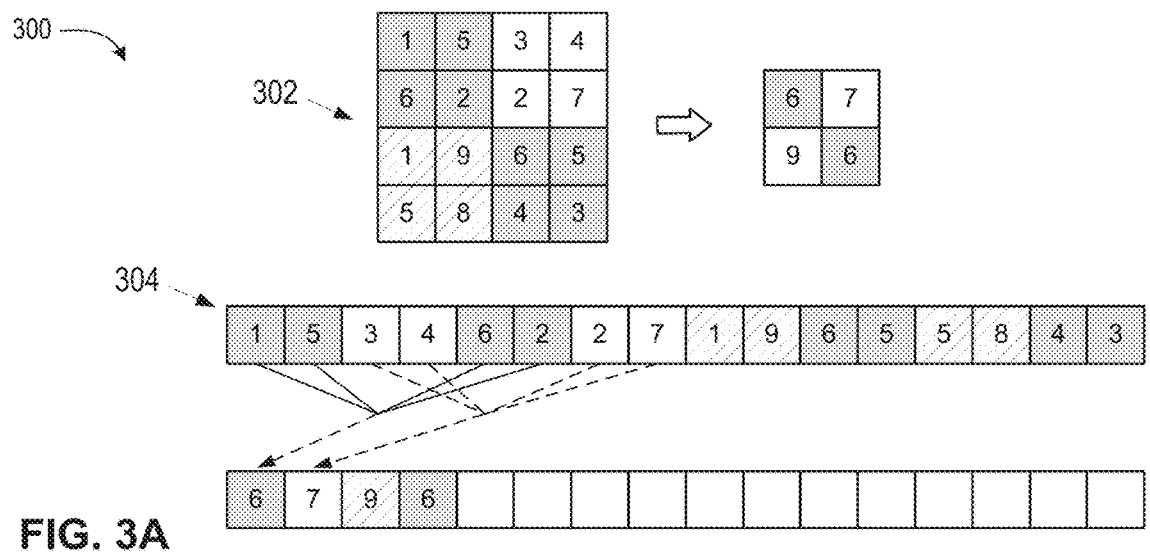
FIG. 3A is a schematic depiction of an example memory utilization for optimized execution of local machine-learning operations, in accordance with some implementations of the present disclosure.

FIG. 3A is a schematic depiction of an example memory utilization 300 for optimized execution of local machine-learning operations, in accordance with some implementations of the present disclosure. Operations of convolutional and pooling layers often involve kernel multiplications that are local in nature. For example, when a 3×3 convolutional kernel is being applied, a top-left element of an input data grid may affect the first two output elements of the top row and the first two outputs of the second row, but do not affect other output elements. A conventional way of storing data during NN processing is by allocating one memory buffer to a data input into a NN layer and a separate buffer to an output of the NN layer. In-place data storing, as illustrated in FIG. 3A obviates the need for the second buffer and overwrites memory addresses once an input element is no longer to be used in other operations. For example, depicted in FIG. 3A is an example maximum pooling operation that is performed using a 2×2 pooling kernel. A region 302 of input data grid is shown. A result of processing of an n×m input data grid may be an output data grid of n/2×m/2 size. Input data grid may be stored in a row-wise manner in a buffer 304. As the top-left 2×2 region of the input data grid is processed and the maximum value 6 is determined by a processor, elements 1, 5, 6, and 2 of the top-left portion are no longer needed for subsequent operations. The processor may, therefore, overwrite one of the input elements (e.g., the first element) with the new value 6 in the first memory address while marking the rest of the memory addresses (currently storing values 5, 6, and 2) as available to accept new data (e.g., by setting a "free" attribute for each of the respective addresses) or the outputs of the current pooling operation (e.g., in a sequential fashion). The process may continue for the rest of the data grid until buffer 304 stores (n/2)×(m/2) elements of the output data grid. As a result, both the input and the output data elements are stored in the same buffer and the memory footprint of the NN execution is reduced significantly. Although the maximum pooling operation is illustrated in FIG. 3A, the same or similar techniques may be used in average pooling operations, convolution operations, or any other operations in which a given input element affects a limited number of output elements rather than all output elements (like would be the case for a fully-connected layer).

Figure 3B:
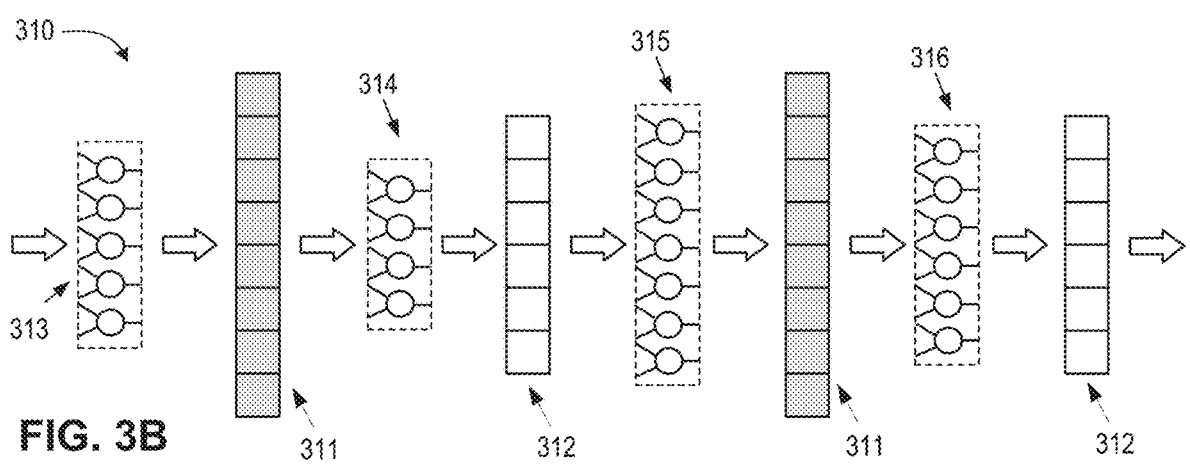
FIG. 3B is a schematic depiction of an example intermediate output scratch memory utilization for optimized execution of machine-learning operations, in accordance with some implementations of the present disclosure.

FIG. 3B is a schematic depiction of an example intermediate output scratch memory utilization 310 for optimized execution of machine-learning operations, in accordance with some implementations of the present disclosure. In NNs where different memory components or partitions (e.g., buffers) are used to store outputs of various neuron layers, a number of buffers may be minimized by assigning separate buffers for alternating neuron layers. For example, a first buffer 311 may be assigned to hold inputs to (or outputs of) odd neuron layers (e.g., layers 313 and 315) and a second buffer 312 may be assigned to hold inputs to (or outputs of) even neuron layers (e.g., layers 314 and 316). The buffers need not have the same size. In some implementations, the size of the first buffer 311 may correspond to a maximum size of the odd neuron layers and the size of the second buffer 312 may correspond to a maximum size of the even neuron layers. In some implementations, where a neuron layer, e.g., layer 315, may accept inputs not only from the preceding layer 314 but also from earlier layers, e.g., layer 313, more than two buffers may be used; for example, a third buffer may be used to hold outputs that are used by further downstream layers. Similarly, the third buffer may be overwritten as soon as the elements stored in the third buffer are no longer to be used as inputs into the remaining nodal operations.

Figure 3C:
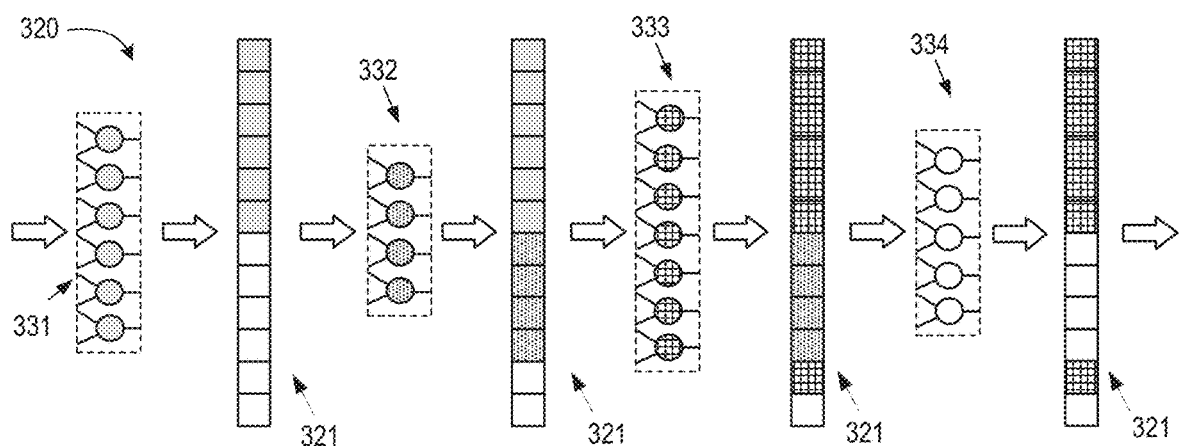
FIG. 3C is a schematic depiction of another example intermediate output scratch memory utilization for optimized execution of machine-learning operations, in accordance with some implementations of the present disclosure.

FIG. 3C is a schematic depiction of another example intermediate output scratch memory utilization 320 for optimized execution of machine-learning operations, in accordance with some implementations of the present disclosure. As depicted in FIG. 3C, in some instances a single memory buffer 321 may be used to store outputs of two consecutive neuron layers. For example an output of layer 331 may be stored in buffer 321, as indicated by the solid shading of both the neurons of layer 331 and respective addresses (squares) of buffer 321. During operations of layer 332, output data may be stored in a white portion of buffer 321 unoccupied by data output by layer 331. (Dotted shading indicates neurons of layer 332 and their outputs stored in buffer 321.) As a result, outputs of layer 331 are available until all operations of layer 332 are complete. During operations of layer 333, output data of layer 331 is no longer needed and may be overwritten with output data of layer 333 (indicated by checkered shading). If the output of layer 332 is larger than output of layer 331, some additional addresses of buffer 321 may be used to store output of layer 332 (as depicted schematically with a checkered square occupying one of previously available (white) addresses. As a result, outputs of layer 332 are available until all operations of layer 333 are complete. Similarly, operation of additional layers (e.g., layer 334) may be performed with new data written over a portion of buffer 321 that is used to store earlier output data (e.g., output of layer 334, indicated by white nodes and white squared, overwrites output of layer 332). In some implementations, the size of buffer 321 may be selected sufficiently large to store outputs of two consecutive layers that have a combined maximum output, as compared with other pairs of consecutive layers. For example, as depicted in FIG. 3C, layers 333 and 334 have a maximum combined output, also equal to the size of buffer 321.

Figure 4A:
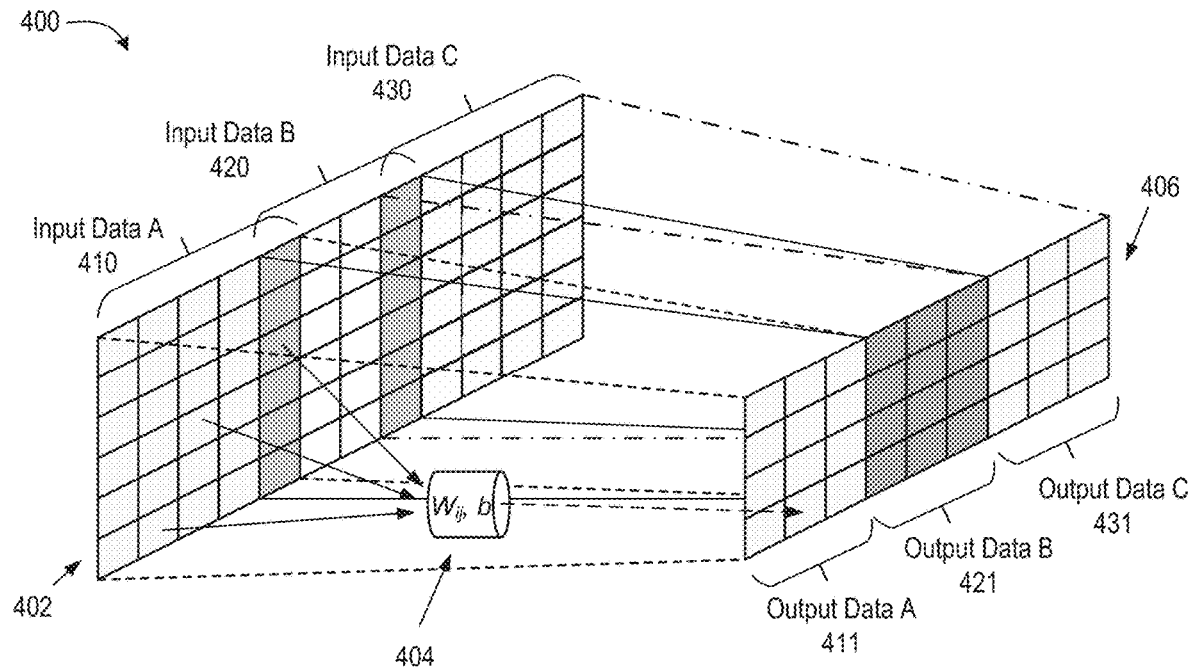
FIG. 4A is a schematic depiction of an example factorization of machine-learning operations, in accordance with some implementations of the present disclosure.

FIG. 4A is a schematic depiction of an example factorization 400 of machine-learning operations, in accordance with some implementations of the present disclosure. In some instances a model 108 and/or an input data into model 108 may be too large to fit into high-speed cache 136 (or any other internal memory) of edge computing device 130. A conventional approach to performing MLM operations in such instances is to load network parameters (e.g., weights and biases) and/or input data from memory 134 to cache 136 prior to performing computations where such parameters and/or input data are used. Parameters and/or input data are then overwritten in the next iteration until all operations are complete. Since the same data may be used in multiple computations, it not unusual to load the same parameters and/or input data into cache 136 multiple times. As depicted schematically in FIG. 4A, in some implementations of the present disclosure, a MLM may be factorized into two or more partitions of such a size that the network parameters and/or input data of each partition can fit into cache 136.

For example, an input into a neuron layer (e.g., a first neuron layer or any hidden neuron layer) is depicted as an input data grid 402, each cell representing an element of data. Although a rectangular grid is shown for specificity, any other grid of input data may be processed similarly. A neuron 404 of the next neuron layer, takes a number of values from the data grid 402 (as depicted with three incoming solid arrows), applies weights $W_{ij}$, bias b, activation function (not depicted), and generates a value indicated by an outgoing arrow within an output data grid 406. In some implementations of the present disclosure, neuron operations of the MLM are factorized into two or more partitions A, B, C, etc. For example, network parameters may be able to fit in cache memory but the input data may be too large to be loaded at once. In such instances, the input data may be factorized into smaller portions that can be loaded into cache memory. Partition A may include operations that use input data A 410 to compute output data A 411 (e.g., a first portion of output data grid 406) and partition(s) B (C, etc.) may include operations that use input data B 420 to compute output data B 421 (output data C 431, etc.). After input data A 410 has been loaded to cache 136 and output data A 411 has been computed, input data B 420 (and, similarly, input data into subsequent partitions) may be loaded into cache 136 and output data B 421 may be computed. In some implementations, network parameters of neuron 404 (and other neurons that are not shown explicitly) may similarly be partitioned into portions and loaded into cache 136 together with the inputs of the corresponding partitions.

In some implementations, input data A 410 and input data B 420 may have a partial overlap (e.g., in the instances of convolutional neuron layers) or even a complete overlap (e.g., in the instances of fully-connected neuron layers). In some instances, fully connected layers can be factorized into non-overlapped partitions. In such cases, the overlapping segments of input data (depicted as shaded strips shared by input data A 410 and input data B 420, and input data B 420 and input data C 430) may be retained in cache 136 when a new portion of the input data is loaded. Correspondingly, non-overlapping segments of data may be overwritten. Although FIG. 4A illustrates segmentation of a single layer of neurons into cache-fitting portions, in some implementations, the portions may extend over multiple layers of neurons.

Figure 4B:
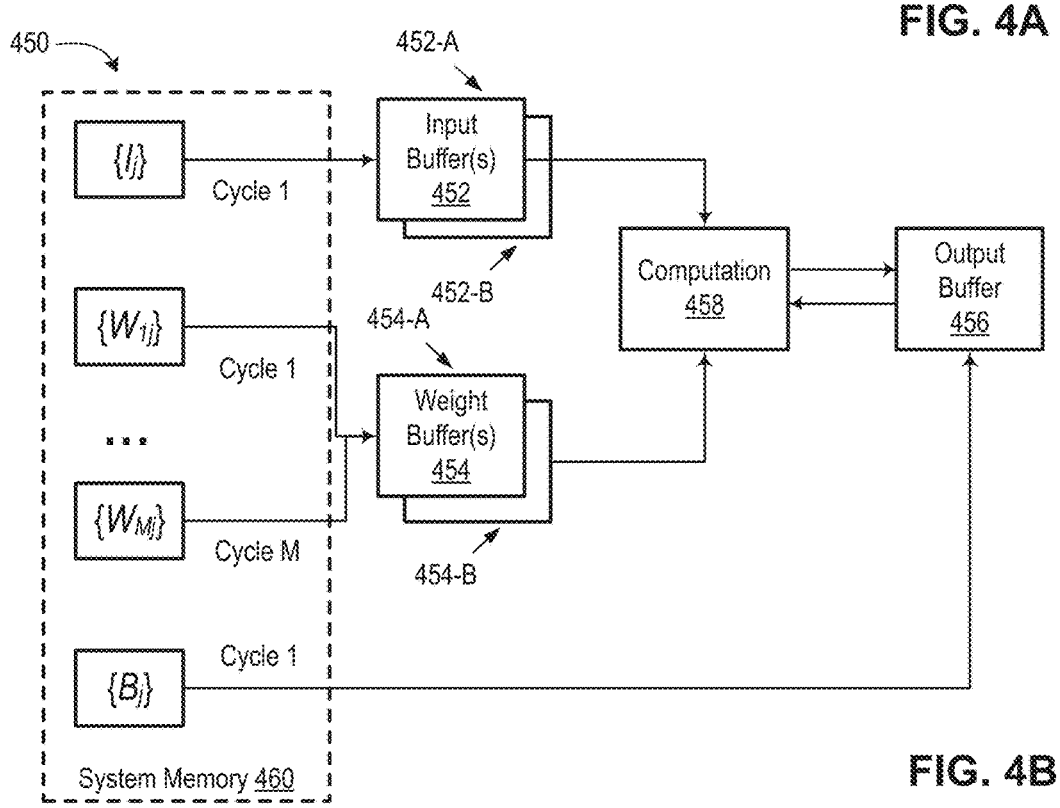
FIG. 4B is a schematic depiction of an example factorization of operations of a neural network layer, in accordance with some implementations of the present disclosure.

FIG. 4B is a schematic depiction of an example factorization 450 of operations of a neural network layer, in accordance with some implementations of the present disclosure. For concreteness, neuron operation of a fully-connected layer are shown in FIG. 4B, but it should be understood that any types of neuron layers (e.g., convolutional neuron layers, deconvolutional neuron layers, recurrent neuron layers, etc.) may be factorized in a similar fashion. Each of N neurons of an input layer may receive an input value $I_j$ (where $1>j>N$). An output of the input layer may include M output values $O_i$ (where $1 \leq i \leq M$). Each output value $O_i$ may be obtained by adding the input values (e.g., some of input values or all input values, in the instances of fully-connected layers) together as a weighted sum using weights $W_{ij}$ and also adding a possible bias value $B_i$:

$$O_i = B_i + \sum_{j=1}^{N} W_{ij} \cdot I_j.$$

In some implementations, the value $O_i$ is an intermediate value to which an activation function is applied in order to obtain the final output value. To perform all such computations and determine M output values, a processing device may have to load N×M weights, M biases, and N input values. Even for neural networks of modest sizes, N can be several thousand (or more) and M can be several hundred (or more). Loading all N×M+M+N values at once from system memory to high-speed cache (e.g., buffers) may exceed a capacity of the cache. FIG. 4B depicts an efficient factorization of data loading and processing in the instances when a buffer is capable of storing at least N values. Input buffer 452 may store all N input values $\{I_j\}$ that are loaded from a system memory 460 during cycle 1 of direct memory access (DMA) operations. Similarly, during cycle 1, N values $\{W_{1j}\}$ of the weights (which determine the first output value $O_1$) may be loaded from system memory 460 to weight buffer 454. Additionally, during cycle 1, M buffer values $\{B_i\}$ may be loaded from system memory 460 to output buffer 456, which will eventually store the output values $\{O_i\}$.

After the above-described loading operations are performed, a computation logic (e.g., arithmetic logic unit or ALU) 458 can perform the computation of cycle 1:

$$O_1 = B_1 + \sum_{j=1}^{N} W_{1j} \cdot I_j,$$

which may be followed by the replacement of the (no longer needed) value $B_1$ with the computed output value $O_1$. (The computations may also include applying an activation function to $O_1$.) In some implementations, the system may have at least two weight buffers 454. While the computations of cycle 1 are being performed and weights $\{W_{1j}\}$ being retrieved from one of weight buffers 454, e.g., weight buffer 454-A, the next set of weights $\{W_{2j}\}$ may be loaded from system memory into the other weight buffer 454, e.g., weight buffer 454-B. Similarly, during arbitrary cycle i, N weights $\{W_{ij}\}$ are loaded into the weight buffer that is currently not being used to provide data to computation logic 458. For example, weight buffer 454-A may receive weights during odd cycles while weight buffer 454-B provides previously received weights to computation logic 458. Similarly, weight buffer 454-B may receive weights during even cycles while weight buffer 454-A provides previously received weights to computation logic 458. During cycle i, a memory address (in the output buffer 456) that stored bias value $B_i$ is used as an accumulator for $O_i$ and stores the final output value $O_i$ after completion of cycle i. After M cycles, all M values $\{O_i\}$ are stored in output buffer 456.

As a result, only three buffers (one input buffer 452 and two weight buffers 454, capable of storing a total of 3N values) may be needed to perform all computations of the first layer. In some implementations, a second input buffer may be used to accept the next set of the input values $\{I_j\}$ (e.g., the next portion of the inference data) while the current set of the input values is being processed.

Figure 4C:
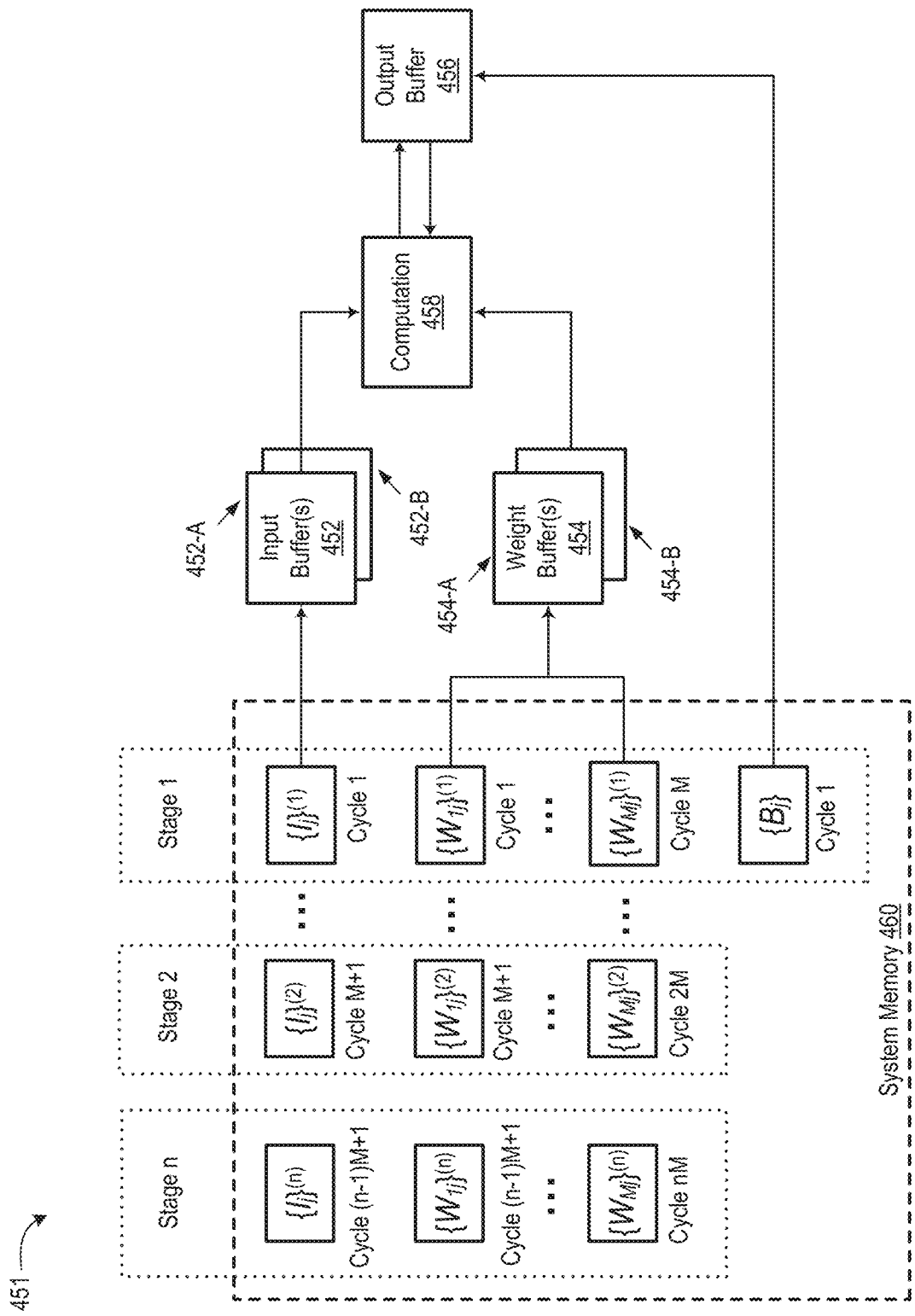
FIG. 4C is a schematic depiction of an example multi-stage factorization of operations of a neural network layer, in accordance with some implementations of the present disclosure.

In some implementations, input buffers 452 and weight buffers 454 may be incapable of storing N values (e.g., N input values $\{I_j\}$ or N weight values of $\{W_{1j}\}$, $\{W_{2j}\}$ ..., etc.). FIG. 4C is a schematic depiction of an example multi-stage factorization 451 of operations of a neural network layer, in accordance with some implementations of the present disclosure. When input buffers 452 and weight buffers 454 are capable of storing N/n values, where n=2, 4, 8, or any other number, the factorization may be performed in n stages, as depicted in FIG. 4C. More specifically, each output value $O_i$ may be obtained using the following representation:

$$O_i = \sum_{k=1}^{n} O_i^{(k)},\ O_i^{(k)} = B_i \cdot \delta_{1,k} + \sum_{j=(k-1)N/n+1}^{kN/n} W_{ij} \cdot I_j.$$

where $O_i^{(k)}$ is a k-th portion of i-th output $O_i$ ($\delta_{1,k}$ is the Kronecker delta). The portion $O_i^{(k)}$ of i-th output is computed using k-th portion of the input values, denoted in FIG. 4C as $\{I_j\}^{(k)}$, that includes values $I_j$ with j within the interval $(k-1)N/n+1 \leq j \leq kN/n$. Furthermore, the portion $O_i^{(k)}$ of i-th output is computed using k-th portion of the weights, denoted in FIG. 4C as $\{W_{ij}\}^{(k)}$, that includes values $W_{ij}$ with j within the interval $(k-1)N/n+1 \leq j \leq kN/n$ and fixed i.

The computations may be performed via two loops. The outer loop performs n stages (enumerated with index k) and the inner loop performs M cycles, one cycle per each output value $O_i$. During cycle 1, a portion $\{I_j\}^{(1)}$ of N/n input values is loaded from system memory to input buffer 452. Similarly, a portion $\{W_{1j}\}^{(1)}$ of N/n weights, which determine the first portion $O_1^{(1)}$ of the first output value $O_1$, is loaded from system memory 460 to weight buffer 454. Additionally, during cycle 1, all M bias values $\{B_i\}$ may be loaded from system memory 460 to output buffer 456. (In those implementations where the number M of buffer values $\{B_i\}$ exceeds the number that can be loaded within one cycle, loading of bias values $\{B_i\}$ may be extended over multiple cycles, e.g., over cycle 2, cycle 3, etc.) The bias values $\{B_i\}$ thus serve as seeds for the respective output values $\{O_i\}$. The computation logic 458 can then perform the computation of cycle 1:

$$O_1^{(1)} = B_1 + \sum_{j=1}^{N/n} W_{1j} \cdot I_j,$$

with the portion $O_1^{(1)}$ replacing the value $B_1$ in the output buffer 456. The remaining cycles 2 through M of stage 1 can be performed similarly, with the bias value $B_i$ and the first portion $\{W_{ij}\}^{(1)}$ of weighs used to compute the first portion $O_i^{(1)}$ of the output value $O_i$.

During subsequent stages, additional portions of the input values and the corresponding portions of weights are used to compute additional portions of the output values. For example, during the first cycle of stage k (cycle (k−1)M+1), the k-th portion of the input values $\{I_j\}^{(k)}$ is loaded to input buffer 452 and the k-th portion of the weights $\{W_{1j}\}^{(k)}$ is loaded into weight buffer 454. The computation logic 458 then computes the portion $O_1^{(k)}$ of the output value $O_1$ by adding $O_1^{(k)}$ to the accumulator that stores the previously computed sum $O_1^{(1)}+O_1^{(2)}+\ldots+O_1^{(k-1)}$. During subsequent cycles of stage k, further portions of weights $\{W_{ij}\}^{(k)}$ are loaded to weight buffer 454 and new portions $O_i^{(k)}$ of the output values $O_i$ are computed. After completion of all n stages, M final values $\{O_i\}$ are stored in the output buffer 456.

As described above in relation to FIG. 4B, in some implementations, the system may have at least two weight buffers 454 (e.g., weight buffer 454-A and weight buffer 454-B) and may perform a staggered loading of weights into weight buffers during consecutive cycles, e.g., while weights $\{W_{ij}\}^{(k)}$ are being retrieved from weight buffer 454-A, the next set of weights $\{W_{i+1,j}\}^{(k)}$ may be loaded from system memory 460 to weight buffer 454-B, and so on. As a result of the described operations, three buffers (one input buffer 452 and two weight buffers 454, capable of storing a total of 3N/n values) may be sufficient to perform all computations of the first layer. In some implementations, the system may have at least two input buffers 452 (e.g., input buffer 452-A and 452-B) and may perform a staggered loading of input values into the input buffers during consecutive cycles. For example, while input values $\{I_j\}^{(k)}$, previously loaded into input buffer 452-A, are being used during k-th stage by computation logic 458, the next set of input values $\{I_j\}^{(k+1)}$ may be loaded from system memory 460 to input buffer 454-B, and so on.

Operations of subsequent (hidden and output) layers may be performed similar to the operations described in conjunction with FIG. 4B and/or FIG. 4C. For example, a hidden layer may be a fully-connected layer with M inputs and M outputs. Operations this the hidden layer may be performed similar to operation described in conjunction with FIG. 4B provided that M is less than (or equal to) the number of values that can be stored in one buffer (e.g., weight buffer and/or input buffer). In such implementations, a single-stage processing may be used as all input values $\{I_j\}$ into the hidden layer can be loaded to input buffer 452 during cycle 1, and all weights $\{W_{ij}\}$ (for a given i) can be loaded during cycle i. Therefore, the entire output value $O_i$ may be determined during cycle i. In those implementations, where M is larger than the number of values that can be stored in one buffer, e.g., larger than the number N/n, in the notations of FIG. 4C description, processing of all output values $\{O_j\}$ of the hidden layer may be performed using m=Mn/N stages or m=Mn/N$_1$ stages, where N$_1$ may be different from N. (If Mn/N$_1$ is non-integer, the next integer number determines the number of stages to be used in performing all operations of the hidden layer.)

Because the output values $\{O_i\}$ of a given layer of neurons are also the input values $\{I_j\}$ into the next layer of neurons, the input values into the hidden layers (and/or into the final output layer of the network) need not be loaded again. As described in conjunction with FIG. 3B, output buffer 456 (storing the output values of the previous layer) may now be designated as new input buffer 452 whereas the input buffer 452 may be designated as new output buffer 456 (the buffer swapping operation). The new input buffer may then be seeded with bias values $\{B_i\}$ of the next layer and used as an accumulator for the output values $\{O_i\}$ of the next layer.

The term "cycle," as used herein, should be understood as any processing unit, e.g., iteration consisting of a number of fetch and execute operations. A meaning of "cycle" may, therefore, be implementation-dependent. For example, what may be a single fetch and execute operation, when performed on one computing device (e.g., a specially designed hardware accelerator, a server or a workstation), may take multiple operations on a different computing device (e.g., a microcontroller unit).

Figure 5:
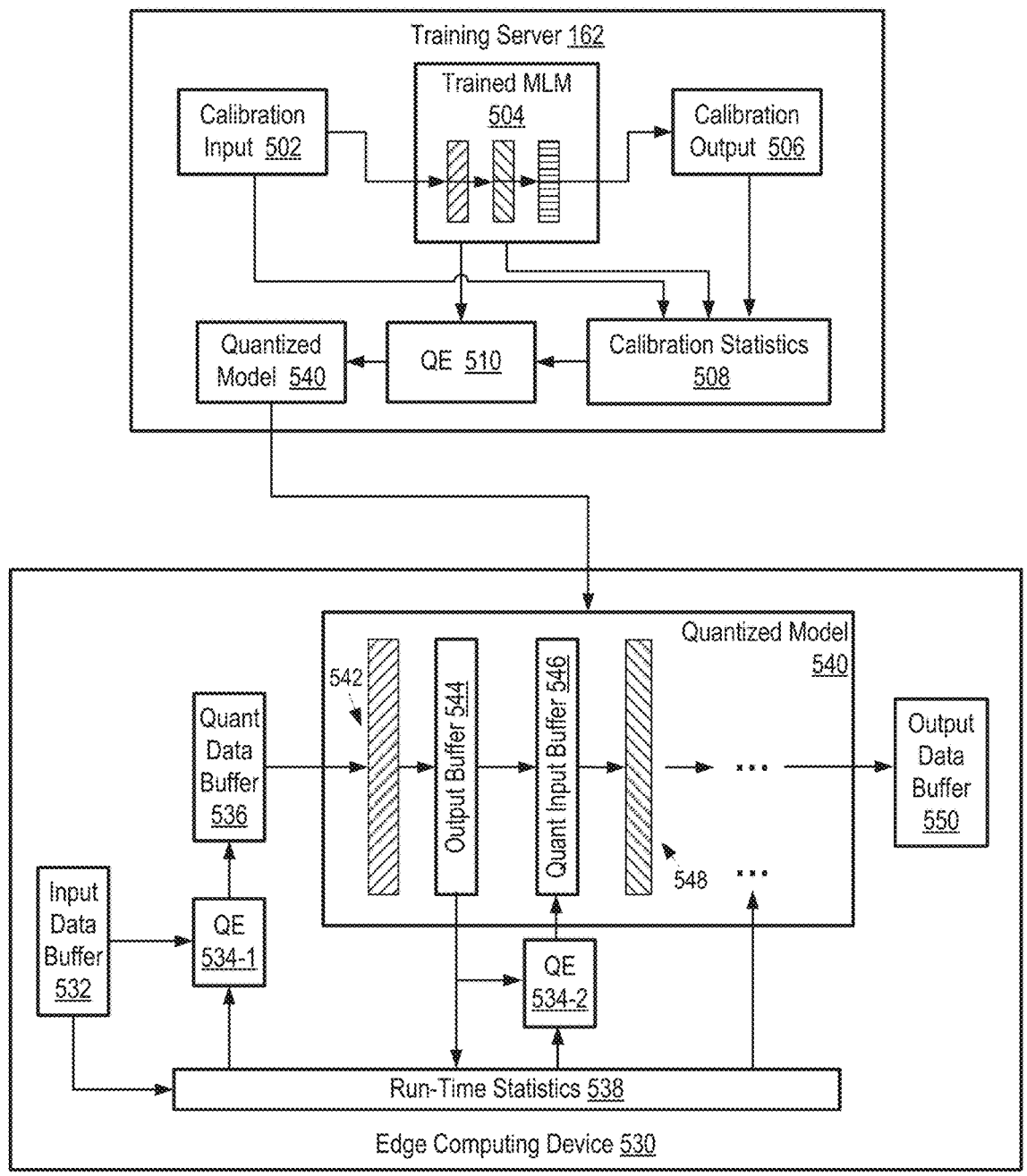
FIG. 5 is a schematic depiction of an example quantization of machine-learning computations performed on edge computing devices, in accordance with some implementations of the present disclosure.

FIG. 5 is a schematic depiction of an example quantization 500 of machine-learning computations performed on edge computing devices, in accordance with some implementations of the present disclosure. MLMs are often trained with training data digitized in the floating-point (FP) format and have network parameters (weights and biases) similarly represented with FP numbers. FP representation allows for very high accuracy but may require more memory bandwidth and substantial processing resources to achieve a fast inference execution. To reduce processing loads, trained MLMs may undergo a number of modifications, such as culling out neurons whose contributions (e.g., by virtue of small weights and biases). Trained MLMs may further undergo quantization. Quantization refers to representing network parameters and data flowing through the neuron layers via lower-precision formats. Quantization may use calibration inputs 502, which may be similar to training inputs used in training of the MLM or even a subset of training inputs (e.g., inputs previously not seen by the MLM).

In particular, network parameters and data of trained MLM 504 may be transformed (quantized) from the FP representation to an N-bit integer representation. For example, calibration input 502 into trained MLM 504 may include values $I_j$ in the FP format that are between −1000 and 1000, e.g., one or the input values may be $I_1$=473.932. The input values may be quantized: rescaled from the [−1000, 1000) FP interval to an interval of integer values, such as [−32,768,32768), e.g., using multiplication $I_1 \times 32768/1000 = 15529.804$, followed by taking the integer part (rounding) of the product: $15529.804 \rightarrow 15530$. As a result, some error may be introduced (e.g., about 0.27% in this example), which may nonetheless be an acceptable trade-off for reducing memory bandwidth and speeding-up the computations of the trained MLM 504. The scaling factor $S = 1000/32768 = 0.03052$ (or the inverse scaling factor $S^{-1} = 32.768$) may be stored (e.g., in a fixed-point format) for subsequent calculation and conversion of data (e.g., neuron operations outputs) from integer format back to FP format. In some implementations, the scaling factor S may be approximated with a power-of-two scaling factor, e.g., $2^{-5}$, so that the multiplication by the scaling factor may be implemented as a bit shift (e.g., a shift by 5 bits to the right). Weights (and/or biases) may use different scaling factors than the scaling factors used for quantization of the input data. Different layers may similarly use different sets of scaling factors.

The output of the first layer may involve multiplication of the input values $I_j$ by weights $W_j$ (as well as adding biases). The weights of the first layer of the trained MLM 504 may be similarly quantized to the same (or different) interval of values. The output of the first layer may be stored in an accumulator buffer whose size is double the size of the input data (e.g., 32 bits, in this example). The outputs of the first layer may also be further quantized, e.g., by rescaling to a different interval of values or to the same interval [32,768, 32,768] as used for the input values. (In some instances, different intervals of values may be used for different layers.) This process may be continued for each of the layers (including hidden layers and the output layer) until output 506 is obtained, which may be the same interval of values as used for some or all intermediate layer outputs, or some other interval of values.

In some implementations, quantization may be assisted by a calibration statistics module 508. More specifically, inputs or outputs values of the layers of trained MLM 504 may not be uniformly distributed across an FP interval or an integer interval of values. For example, calibration statistics module 508 may determine that 90% (or any other target fraction) of calibration input 502 values is within an interval between $I_{lower} = 150.000$ and $I_{upper} = 840.000$. Calibration statistics module 508 may determine the boundaries $I_{lower}$ and $I_{upper}$ based on statistics collected for multiple calibration inputs 502. Accordingly, calibration statistic module 508 may determine that the input values outside this interval may be discarded while the values within the reduced interval [150.000,840.000) are to be rescaled onto the integer interval [−32,768, 32,767], $I_j \rightarrow I_Q$, e.g., using, $$I_Q = \text{Clip}([S^{-1} \cdot I_j] + z),$$

where z may be a constant zero-point value, [·] is the rounding (to the nearest integer) function, and Clip(·) is a function that clips the argument to the integer interval [−32,768, 32,767]. The relation between the integer values $I_Q$ and floating-point values $I_j$ is given by the inverse transformation, $$I_j = S \cdot (I_Q - z),$$

Those input values $I_j$ that are below $I_{lower}$ may be represented with the minimum integer value, e.g., −32,768 and those that are above $I_{upper}$ may be represented with the maximum integer value, e.g., 32,767. Such a rescaling may more efficiently utilize the available integer interval to represent the most important interval of values, between $I_{lower}$ and $I_{upper}$. The described quantization transformation may be performed for both the input (output) values and the model parameters (e.g., weights and biases) of the trained MLM 504. The quantization transformation identified by calibration statistics module 508 may be implemented by a quantization engine (QE) 510. The described process can be repeated for each layer of the trained MLM 504 until a quantized model 540 is generated, in which the model parameters, including intermediate layer outputs, are quantized.

The above example is intended to be illustrative. In some implementations, QE 510 may perform any linear transformation that amounts to a shift and rescaling of the interval of values $[I_{lower}, I_{upper}]$ onto a target interval of integer values [−Z,Z−1], which may be stored as an N-bit integer value (with N=8, 16, etc.), e.g., in an input or output buffer. In some implementations, non-linear transformations may be used. Some of the operations described above may be performed on training server 162 and/or host computing device 102.

The quantized model may be provided to an edge computing device 530 (which may be edge computing device 130 or any other device). In some implementations, during inference on the edge computing device 530, the inputs into the quantized model 540 may vary significantly. For example, in voice recognition applications or speech recognition applications, the intensity of detected sounds may change considerably, as some people may speak quieter than others, and even the same people can speak loudly on some occasions and quietly on other occasions, or may be positioned at different distances from the microphone(s), and so on. This may result in a strong variation of the input values. In some applications, MLM is pre-trained by a third party and input data used for training is not available. As a result, the weights and biases of the MLM may be quantized and optimized but no data is available to perform calibration and quantization of MLM's input and output (including intermediate hidden layer neuron outputs). To address this and other technological challenges, the edge computing device 530 may perform additional run-time quantization of quantized model 540. In some implementations, quantized model 540 may be previously quantized on training server 162 or host computing device 102, as described above, e.g., with weights and biases quantized but input data (as well as outputs of all neuron layers) quantized during run-time execution on the edge computing device 530.

Input data (e.g., a certain number of milliseconds of speech) may be stored in an input data buffer 532, e.g., in a FP format. Data in the input data buffer 532 may be analyzed by a run-time statistics module 538, e.g., similarly to how calibration statistics module operates on training server 162. In some implementations, run-time statistics module 538 may use a processor (microcontroller, or a specially designed hardware) instruction that detects a range (e.g., a number of integer bits and/or a number of fractional bits) of the data stored in the input data buffer 532. Various metrics about the input data may be analyzed by run-time statistics module 538 and a most relevant interval $[I_{lower}, I_{upper}]$ for the input data may be identified. The run-time statistics module 538 may provide the parameters of the identified intervals to a run-time QE 534-1, which may operate similarly to QE 510 on the training server 162. QE 534-1 may implement a quantization transformation on the input data into the first layer 542. The quantized input data may be stored in a quantized data buffer 536 before being input into the first layer 542. The output of the first layer 542 may be stored in an output buffer 544, which may be a temporary buffer that is used for any other data storage once the data in output buffer 544 is quantized (and moved to buffer 546).

The data in the output buffer 544 may be analyzed by the run-time statistical module 538.

More specifically, various metrics about the data stored in output buffer 544 may be analyzed by run-time statistics module 538 and the target intervals for the output data may be identified. The run-time statistics module 538 may provide the parameters of the identified intervals to run-time QE 534-2. QE 534-2 may be implemented via circuits that are separate from circuits of QE 534-1. In some implementations, QE 534-2 may share some or all circuits with QE 534-1. QE 534-2 may implement a quantization transformation on the data output by the first layer and the quantized result may be stored in a quantized input buffer 546. The data stored in the quantized input buffer 546 may then be fed to the second layer 548. A similar process may continue for any of the remaining layers of quantized model 540. The output of the quantized model 540 may be stored in output data buffer 550.

In some implementations, the size of the interval may be different for different layers. For example, input data into the first layer 542 may be quantized to 16-bit integers, input data into the second layer 548 may be quantized to 12-bit integers, input data into a third layer may be quantized to 10-bit integers, and so on. In additional to the size of the intervals, run-time quantization may keep track of the scaling factors for input data, weights, biases, activation functions, which may further be different for different layers. Each of the scaling factors may be determined at run-time based on the statistics on the input data and intermediate data. In some implementations a bit length of data (e.g., integer or fixed-point) may be varied and optimized, as described above. In some implementations, a bit-length may be selected from a number of available format recognized by a CPU of the edge computing device (such as 32 bits, 16 bits, 8 bits, and the like). For example, if the only the 8-bit memory addresses are available, scaling factors may be optimized for each layer of the neural network operations. The described run-time quantization operations may be performed for each input data packet received by edge computing device 530, for each batch of packets received by edge computing device 530, and so on.

Various other optimizations may be performed on edge computing device 130 for more efficient run-time inferencing. In some implementations, one of the neuron layers may have one or more softmax operations. For example, an input into a layer of a NN may include M values $x_j$ (which may be an output by M neurons of the preceding layer). The output of the layer may include probabilities $w_j$ (e.g., classification probabilities) computed using the softmax function, $$w_j = \frac{e^{x_j}}{\sum_{k=1}^{M} e^{x_k}}.$$

A probability $w_j$ may indicate how likely a particular inference outcome is, e.g., how likely that a hand-written text contains a specific word or phrase, how likely a particular image is to contain a depiction of a human being, how likely that a set of data is indicative of an error in a technological process, and so on. Computing the softmax function may be a costly operation requiring substantial processing and memory resources. For example, computing each exponential $e^{x_k}$ may take a significant number of cycles that include multiplication and addition operations, referencing look-up tables, and the like. In some implementations, e.g., in which an MLM is deployed on an edge computing device, the layer (or classifier) that computes probabilities $w_j$ may be replaced with a layer that identifies a maximum value $x_j$. The respective node j may correspond to the most likely classification of the input data, e.g., as noise (j=1), voice of person A (j=2), voice of person B (j=3), a specific word or series of words spoken, and so on. Having identified the maximum value $x_j$ of the output layer, a processing device executing the MLM may output the respective classification j.

FIGS. 6-9 illustrate example methods 600-900 and their possible variations of optimized deployment of MLMs on target-specific platforms for maximum utilization of available computing resources. Methods 600-900 and/or each of their individual functions, routines, subroutines, or operations may be performed by one or more processing units (CPUs, GPUs, field-programmable gate arrays or FPGA, etc.) and memory devices communicatively coupled to the processing units of host computing device 102, edge computing device 130, or any other suitable processing device. In certain implementations, a single processing thread may perform methods 600-900. Alternatively, two or more processing threads may perform methods 600-900, each thread executing one or more individual functions, routines, subroutines, or operations of the methods. In an illustrative example, the processing threads implementing methods 600-900 may be synchronized (e.g., using semaphores, critical sections, and/or other thread synchronization mechanisms). Alternatively, the processing threads implementing methods 600-900 may be executed asynchronously with respect to each other. Various operations of methods 600-900 may be performed in a different order compared with the order shown in FIGS. 6-9. Some operations of methods 600-900 may be performed concurrently with other operations. Some operations can be optional.

Figure 6:
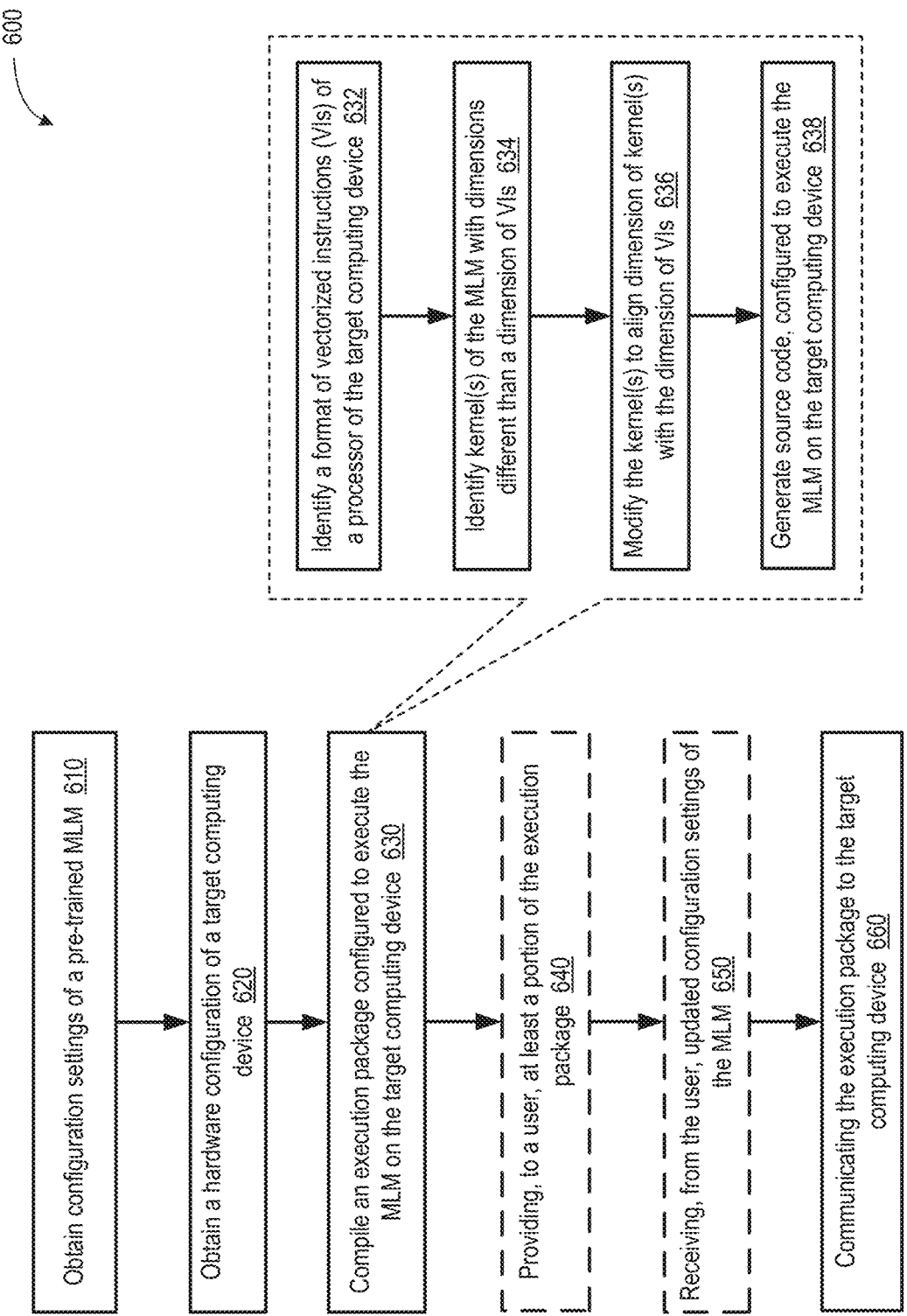
FIG. 6 is a flow diagram of an example method of deploying one or more machine learning models on target-specific platforms, in accordance with some implementations of the present disclosure.

FIG. 6 is a flow diagram of an example method 600 of deploying one or more machine learning models on target-specific platforms, in accordance with some implementations of the present disclosure. Method 600 may be used to ensure that MLMs, trained on one platform, are efficiently deployed and executed on a different platform. At block 610, method 600 may include obtaining configuration settings of a pre-trained MLM (e.g., an MLM trained on host computing device 102). The configuration settings of the MLM may include information characterizing a flow of data associated with the MLM, e.g., a map of data flows between different nodes (such as neurons) of the MLM, type of the MLM (such as a neural network, decision tree, etc.), architecture of the MLM (e.g., convolutional NN, Boltzmann state machine, etc.). The configuration settings may further include parameters of computational operations associated with the MLM. Such parameters may include weights, biases, and activation functions of various neurons of the MLM, classifiers used by various (e.g., final) layers of neurons of the MLM, and so on.

At block 620, method 600 may continue with the processing device obtaining a hardware configuration of a target computing device (e.g., edge computing device 130). The hardware configuration may include characteristics of a processor on the target computing device, such as CPU/GPU type, number of CPU/GPU hardware threads, CPU/GPU clock rate, ISA of the CPU/GPU, and the like. The hardware configuration may further include characteristics of a memory device of the target computing device, such as a memory size, memory type, memory access speed, size of the memory address, and the like.

At block 630, method 600 may continue with the processing device compiling, in view of the configuration settings of the MLM and the hardware configuration of the target computing device, an execution package configured to execute the MLM on the target computing device. The execution package may include a source code configured to execute the MLM on the target computing device and a configuration file linked to the source code and defining execution of one or more operations of the source code.

As depicted with a callout section in FIG. 6, compiling an execution may involve a number of operations. For example, at block 632, the processing device may identify a format of vectorized instructions of the processor of the target computing device. At block 634, the processing device may identify that one or more kernels of the MLM have a dimension that is different than a dimension of the vectorized instructions of the processor of the target computing device. At block 636, the processing device may modify the one or more kernels of the MLM to align the dimension of each (or some) of the one or more kernels with the dimension of the vectorized instructions. Kernel modification may be performed by padding kernels up to the dimension of the vectorized instructions, by splitting a kernel into two or more kernels, each split portion having the dimension of the vectorized instructions, or by any combination thereof. At block 638, the processing device may generate a source code, configured to execute the MLM on the target computing device, in view of the identified format of the vectorized instructions At optional (as indicated by the dashed box) block 640, method 600 may include providing to a user (e.g., a developer) at least a portion of the execution package, e.g., the configuration file. In some implementations, the configuration file may be accessed by the user via an API that communicates to the user in a graphical, formulaic, or any other suitable user-readable format, how the MLM is to be executed on the target computing device. At optional block 650, method 600 may include receiving, from the user, updated configuration settings of the MLM. In some implementations, block 630 may be repeated in response to the received updated configuration settings and a new execution package may be compiled. At block 660, the processing device may communicate the execution package to the target computing device.

Figure 7:
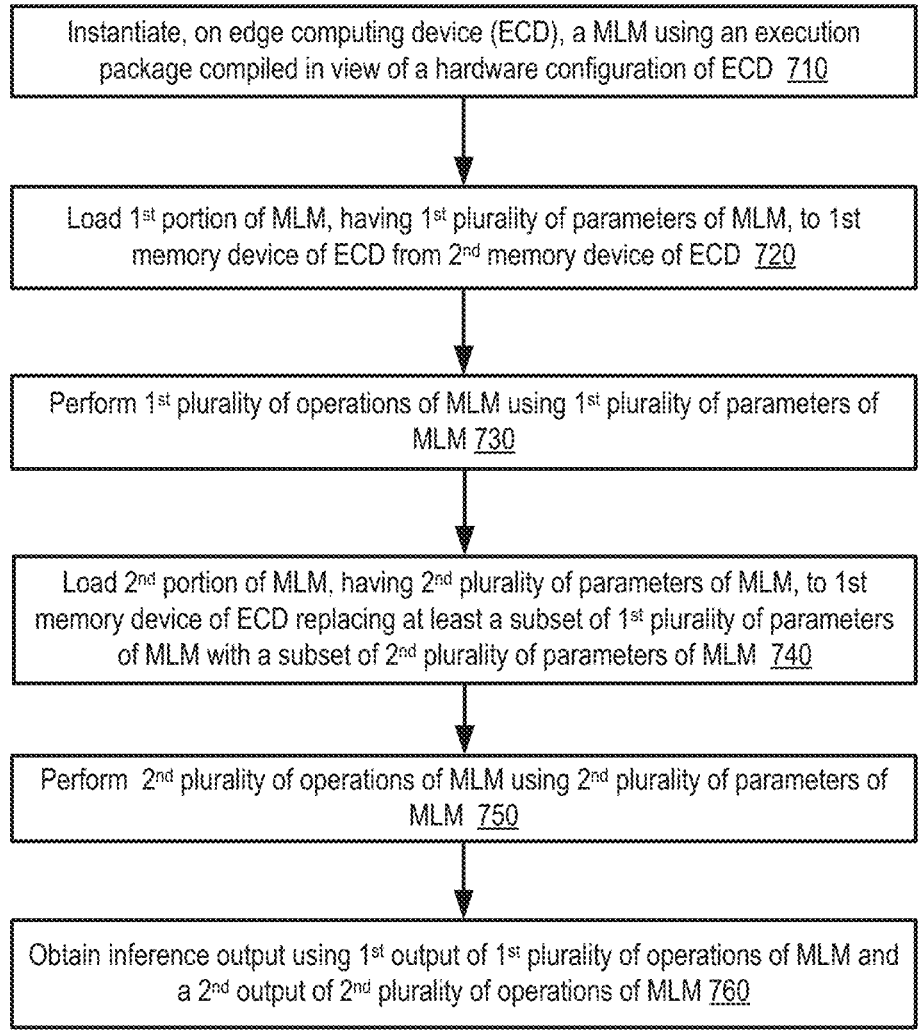
FIG. 7 is a flow diagram of an example method of executing one or more machine learning models on target-specific platforms, in accordance with some implementations of the present disclosure.

FIG. 7 is a flow diagram of an example method 700 of executing one or more machine learning models on target-specific platforms, in accordance with some implementations of the present disclosure. In some implementations, method 700 may be performed by a processing device of an edge computing device (ECD) to execute an MLM thereon. In some implementations, an ECD may include a microcontroller unit with processor speed less than 2.0 DMIPS/MHz, such as ARM® Cortex®-M4 or a similar processing device. In some implementations, the processing device of the ECD may be a 32-bit processor having a floating point support unit. At block 710, the processing device of the ECD may instantiate, on the ECD, the MLM using an execution package compiled in view of a hardware configuration of the ECD. In some implementations, the execution package may be compiled as described above in connection with method 600 and FIG. 6. The hardware configuration may include at least one of characteristics of the processor of the ECD or characteristics of a first memory device of the ECD. For example, the first memory device may be cache (e.g., high-speed memory on the processor chip).

Method 700 may continue with the processing device of the ECD processing inference data, using the instantiated MLM, to obtain an inference output. In some implementations, processing the inference data may include operations of blocks 720-760. More specifically, at block 720, method 700 may include loading a first portion of the MLM, the first portion including a first plurality of parameters of the MLM, to the first memory device of the ECD (e.g., one or more memory buffers) from a second memory device of the ECD (e.g., system memory, which may be a random-access memory, etc.). The parameters of the MLM may include weights, biases, activation functions, classifiers, and so on. In some implementations, the second memory device may be a random-access memory connected to the processor by a bus interconnect. In another implementation, the second memory device may be located outside the ECD (e.g., on a network-based memory) but may be communicatively coupled to the ECD. The first portion of the MLM may include parameters of one or more neuron layers, or portions of one or more layers, e.g., as described in connection with FIGS. 4A-C. The first portion of the MLM may include a whole layer of neurons, more than one layer of neurons, a fraction of one layer of neurons, or a fraction of more than one layer of neurons. At block 730, method 700 may continue with the processing device performing a first plurality of operations of the MLM using the loaded first plurality of parameters of the MLM.

At block 740, method 700 may continue with loading a second portion of the MLM to the first memory device of the ECD. The second portion may include a second plurality of parameters of the MLM. Loading the second portion of the MLM may be performed by replacing, in the second memory device of the ECD, at least a subset of the first plurality of parameters of the MLM with a subset of the second plurality of parameters of the MLM. More specifically, some of the first plurality of parameters of the MLM may be overwritten whereas some of the first plurality of parameters may be kept for subsequent use. In some implementations, all the first plurality parameters may be replaced. At block 750, method 700 may continue with the processing device performing a second plurality of operations of the MLM using the second plurality of parameters of the MLM. At block 760, the processing device performing method 700 may obtain an inference output of the MLM using a first output of the first plurality of operations of the MLM and a second output of the second plurality of operations of the MLM. In some implementations, the first output and/or the second output may be used as input into additional neural operations (e.g., as input into one or more additional neuron layers). Parameters of additional neural operations may be loaded similarly, by replacing at least some of the previously loaded parameters.

In some implementations, processing the inference data may include applying different kernels to different portions of the inference data or to different portions of intermediate data obtained by processing of the inference data. For example, a first kernel may be applied to a first portion of the data while a second kernel may be applied to a second portion of the data. The second kernel may be obtained by truncating the first kernel to a size of the second portion of the data, e.g., as described in connection with FIG. 2. For example, the second portion of the data may be abutting a boundary of the data, so that an application of the first kernel would extend beyond the boundary of the data. In such instances, the first kernel may be reduced (e.g., by eliminating some elements of the kernel) to obtain the second kernel whose size fits the size of the data near the boundary. The second kernel may have a different shape (and kernel values) depending on which boundary (e.g., left, top, etc.) the data abuts.

In some implementations, processing the inference data may include applying one or more kernels of the MLM, the kernel(s) having a dimension that has been aligned with a dimension of vectorized instructions of a processor of the ECD. More specifically, a first kernel (second kernel, etc.) of the MLM may include a padding; a number of bits of the padding may be determined to align a dimension of the first padding with the dimension of the vectorized instructions. In some implementations, the padding of the first (second, etc.) kernel may be performed during compilation of the execution package (e.g., on a host computing device or on a training server or on ECD) while the padded kernels may be applied on the ECD.

Figure 8:
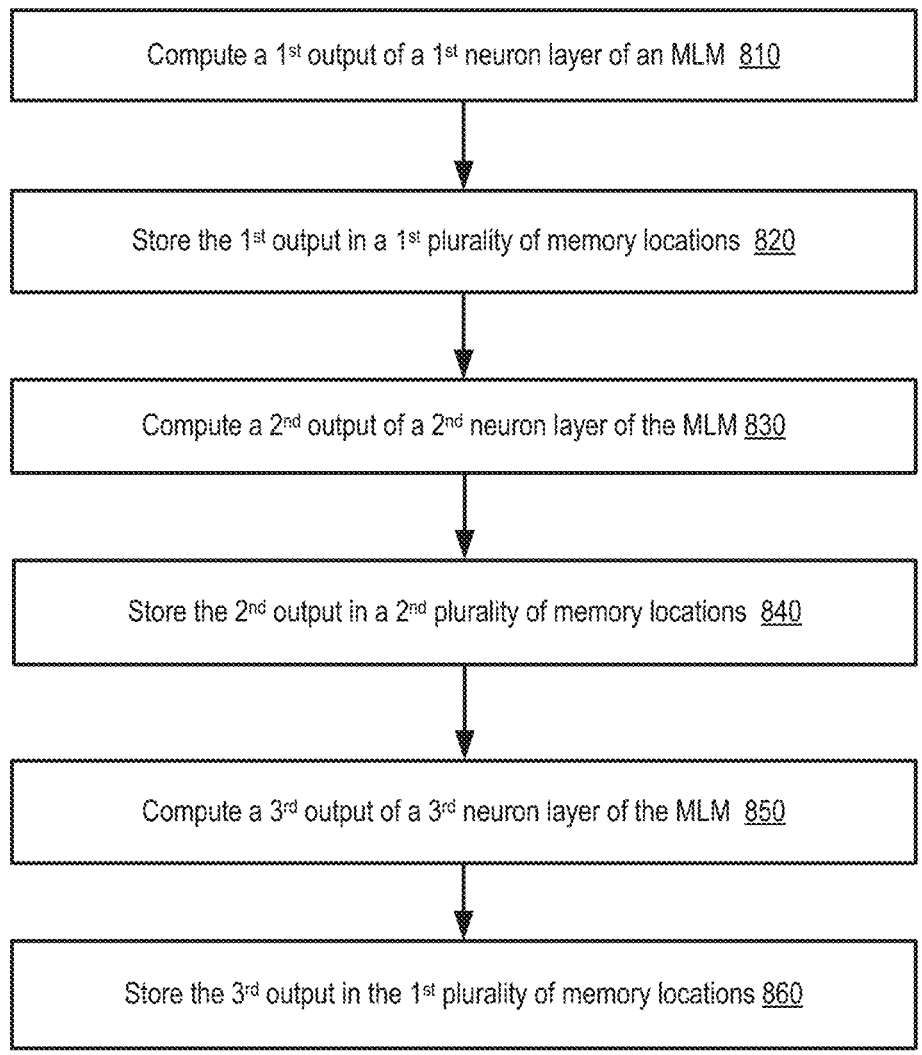
FIG. 8 is a flow diagram of an example method of optimization of memory use during execution one or more machine learning models, in accordance with some implementations of the present disclosure.

FIG. 8 is a flow diagram of an example method 800 of optimization of memory use during execution one or more machine learning models, in accordance with some implementations of the present disclosure. In some implementations, method 800 may be performed by a processing device of an edge computing device (ECD) to deploy an MLM thereon. In some implementations, an ECD may include a microcontroller unit with processor speed less than 2.0 DMIPS/MHz, such as ARM® Cortex®-M4 or a similar processing device. In some implementations, the processing device of the ECD may be a 32-bit processor having a floating point support unit. In some implementations, method 800 may be performed by a processing device of any computer that applies an MLM, including a desktop computer, a server computer, a cloud computer, and so on. At block 810, a processing device performing method 800 may compute a first output of a first neuron layer of the MLM. The terms "first," "second," and "third" should be understood as identifiers and do not presuppose any rigid order. For example, the first layer may be any neuron layer of the MLM, including the input neuron layer, or any of the hidden layers of the MLM.

At block 820, method 800 may continue with the processing device storing the first output in a first plurality of memory locations. The first output may include multiple numbers output by various neurons of the first layer of neurons. Memory locations may refer to any units of memory identified with memory addresses and capable of storing any integer numbers or floating-point numbers. The first plurality of memory locations may be in a single memory component or partition, e.g., a memory buffer or register. At block 830, the processing device performing method 800 may compute a second output of a second neuron layer of the MLM. For example, an input into the second neuron layer of the MLM may include the first output (output of the first neuron layer). At block 840, method 800 may continue with the processing device storing the second output in a second plurality of memory locations. In some implementations, as depicted in FIG. 3B, the first plurality of memory locations are in a first memory buffer (e.g., first buffer 311) and the second plurality of memory locations are in a second memory buffer (e.g., second buffer 312) different from the first memory buffer. In some implementations, as depicted in FIG. 3C, the first plurality of memory locations and the second plurality of memory locations are in the same memory buffer (e.g., buffer 321).

At block 850, the processing device performing method 800 may compute a third output of a third neuron layer of the MLM. For example, an input into the third neuron layer of the MLM may include the second output (output of the second neuron layer). At block 860, method 800 may continue with the processing device storing the third output in the first plurality of memory locations. In some implementations, at least some of the first plurality of memory locations are overwritten at block 860, as storing data that is no longer to be used in subsequent operations of the MLM. In those implementations where two memory buffers are being used, a size of the first memory buffer may be sufficient to store an output of any one of the odd-numbered neuron layers of the MLM, where the odd-numbered layers of the MLM include the first neuron layer, the third neuron layer, and so on. Similarly, a size of the second memory buffer may be sufficient to store an output of any one of the even-numbered neuron layers of the MLM, the even-numbered neuron layers of the MLM including the second neuron layer, the fourth neuron layer (if present), and so on. In those implementations where a single memory buffer is being used, a size of the single memory buffer may be sufficient to store outputs of any two consecutive neuron layers of the MLM. In any of the described implementations, any of the memory buffers may be a cache buffer located on a processor chip of the processing device (for faster execution of read and/or write operations). The sequence of the compute-and-store operations described above for three neuron layers may be continued for an arbitrary number of neuron layers of the MLM.

Figure 9:
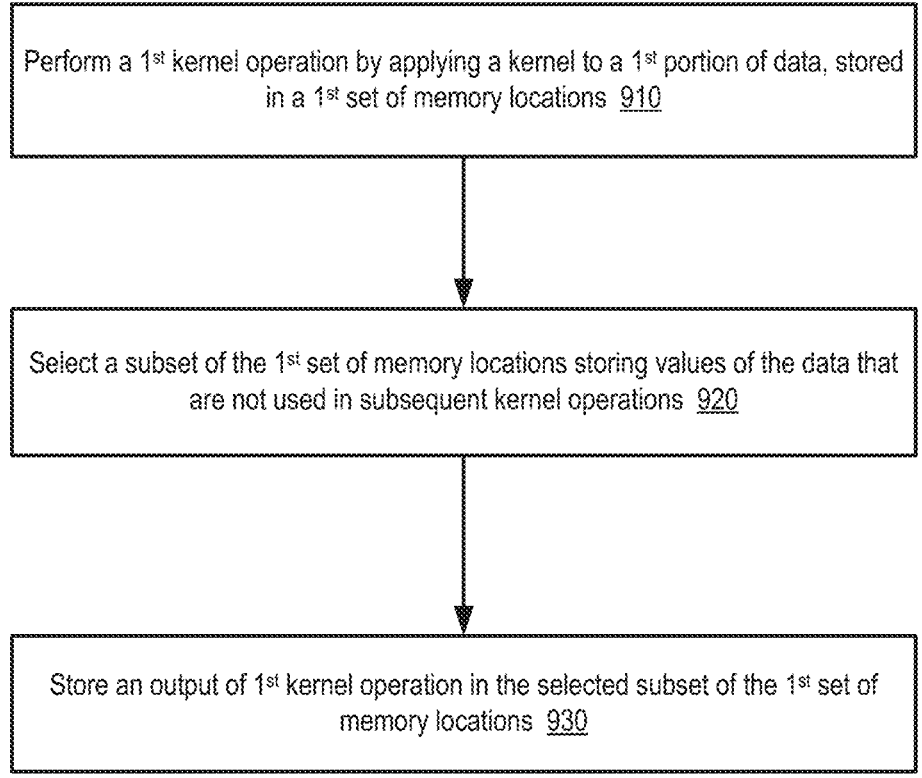
FIG. 9 is a flow diagram of another example method of optimization of memory use during execution one or more machine learning models, in accordance with some implementations of the present disclosure.

FIG. 9 is a flow diagram of another example method 900 of optimization of memory use during execution one or more machine learning models, in accordance with some implementations of the present disclosure. In some implementations, method 900 may be performed by a processing device of an edge computing device (ECD) to deploy a MLM thereon. In some implementations, an ECD may include a microcontroller unit with processor speed less than 2.0 DMIPS/MHz, such as ARM® Cortex®-M4 or a similar processing device. In some implementations, the processing device of the ECD may be a 32-bit processor having a floating point support unit. In some implementations, method 900 may be performed by a processing device of any computer that applies a MLM, including a desktop computer, a server computer, a cloud computer, and so on. As part of MLM processing, e.g., as part of operations of one of the neuron layers, a processing device performing method 900 may identify a kernel and apply the kernel to data. The data may be input data (e.g., data processed by an input neuron layer of the MLM) or any intermediate data (e.g., data previously processed by one or more neuron layers of the MLM).

A plurality of kernel operation may be applied to the data. More specifically, the kernel may be applied to multiple portions of the data, e.g., in a sliding fashion, with any suitable stride identifying a shift of the kernel relative to the data. More specifically, each of the plurality of kernel operations may include an application of the kernel to a respective portion of data. For example, as depicted in FIG. 3A, the kernel may be a pooling kernel applied to non-overlapping portions of the data (e.g., a stride equal to the size of the kernel), the first kernel operation applied to the top-left portion of the region 302 of the data, the second kernel operation applied to the top-right portion of the region 302 of the data, and so on. In some implementations, the kernel may be a convolutional kernel applied to overlapping portions of the data (e.g., a stride less than the size of the kernel).

At block 910, a processing device performing method 900 may perform a first kernel operation of the plurality of kernel operations of a machine-learning model, e.g., by applying the kernel to a first portion of the plurality of portions of the data. Prior to application of the kernel, the first portion of the data may be stored in a first set of memory locations. For example, referring again to FIG. 3A, the top-left portion of the region 302 may be stored in the first, second, fifth, and sixth elements of buffer 304. At block 920, method 900 may continue with the processing device selecting a subset of the first set of memory locations storing values of the data that are not used in subsequent kernel operations. For example, after computing an output of the first kernel operation (e.g., selecting 6 as the maximum element of the top-left portion of the data), the processing device may select the first element of buffer 304 as storing a value (e.g., 1) that is not to be used in subsequent kernel (or any other) operations of the MLM. At block 930, method 900 may continue with the processing device storing the output of the first kernel operation in the selected subset of the first set of memory locations. Similarly, memory may be reused in connection with a second kernel operation (e.g., application of the kernel to the top-right portion of region 302), third kernel operation, and so on.

Multiple variations of method 900 are possible. Although a maximum pooling kernel is used above to illustrate performance of operations of method 900, a kernel that computes an average value within a respective portion of data or a kernel that computes a convolution of the respective portion of data may be used instead. Similarly, memory optimization may be achieved with any kernel that outputs data whose size is less than the size of the input into the kernel. In any of the described implementations, the first (second, third, etc.) set of memory locations may be in a cache buffer located on a processor chip of the processing device performing method 900.

Figure 10:
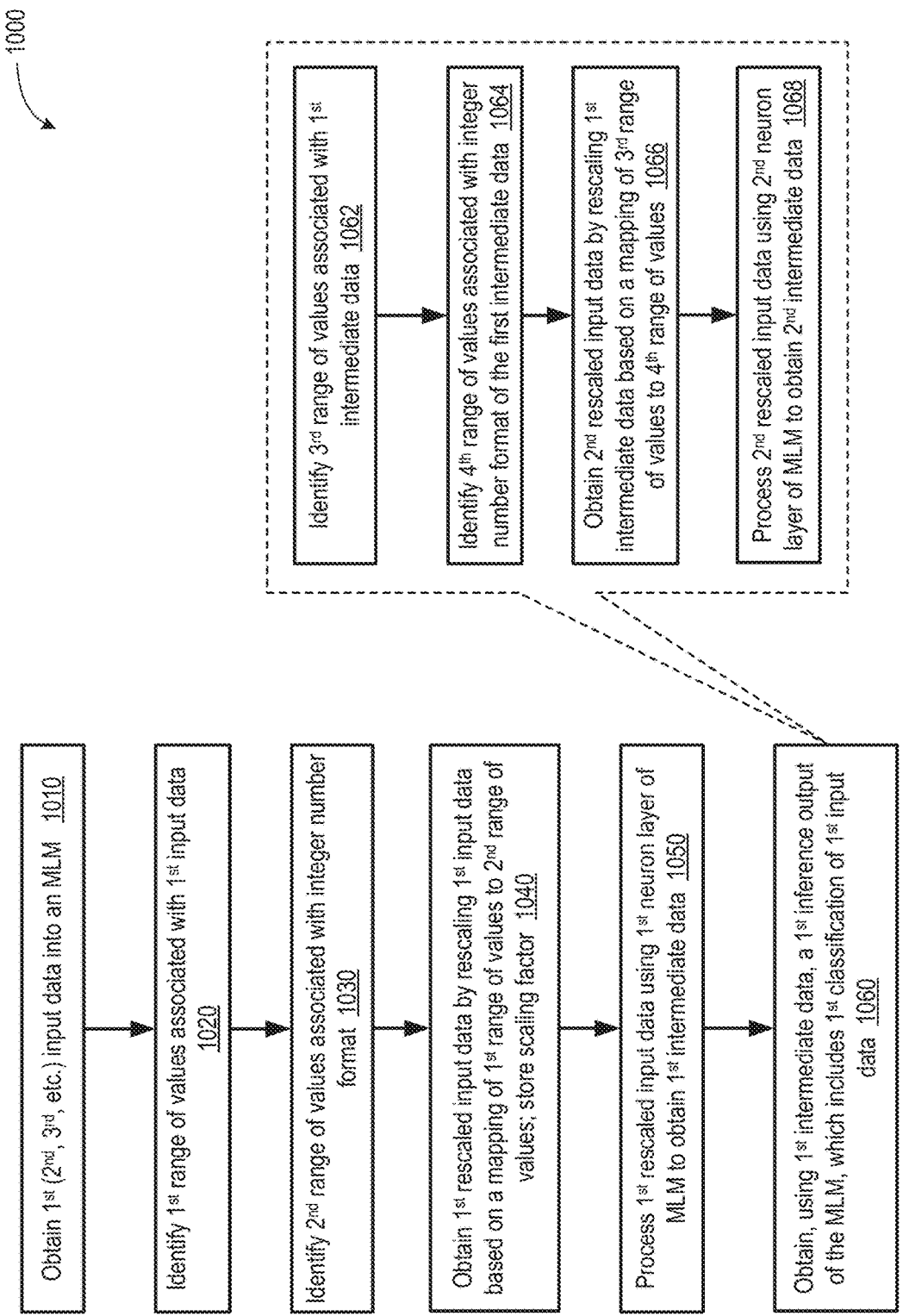
FIG. 10 is a flow diagram an example method of performing a run-time quantization of data processed by one or more machine learning models, in accordance with some implementations of the present disclosure.

FIG. 10 is a flow diagram an example method 1000 of performing a run-time quantization of data processed by one or more machine learning models, in accordance with some implementations of the present disclosure. In some implementations, method 1000 may be performed by a processing device of an edge computing device (ECD) that deploys a MLM. The ECD may be a microcontroller that supports integer number arithmetic and/or floating-point arithmetic. In some implementations, method 1000 may be performed by a processing device of any suitable computer that applies the MLM. Method 1000 may be used to deploy a previously trained and quantized MLM. The quantization performed (e.g., by a training server) may include changing parameters of the trained MLM (e.g., weights, biases, activation functions, etc.) from the floating-point number format to an integer number format. Different integer number formats (e.g., 4-bit format, 8-bit format, 16-bit format, etc.) may be used for network parameters of different layers of neurons of the MLM. In some implementations, the network parameters of all layers of neurons may have the same format.

At block 1010, method 1000 may include the processing device obtaining a first input data into the MLM. The first input data may be a part of a plurality of input data that includes any number of the input data. "First" is used herein as a mere identifier of some specific input data of the plurality of the input data and does not presuppose any rigid order. In some implementations, the first (or any other) input data is in a floating-point number format. In some implementations, the first (or any other) input data in an integer number format. In some implementations, the first (or any other) input data includes a digital representation of a sound, e.g., a sequence of bits representative of a segment of a human voice and/or speech, or any other sound.

At block 1020, method 1000 may continue with the processing device identifying a first range of values associated with the first input data, e.g., $[I_{lower}, I_{upper}]$. For example, the first range of values $[I_{lower}, I_{upper}]$ may include a minimum value $I_{min}$ of the first input data (such that $I_{lower} \leq I_{min}$) and a maximum value $I_{max}$ of the first input data (such that $I_{max} \leq I_{upper}$). In some implementations, the first range of values $[I_{lower}, I_{upper}]$ may include a predetermined portion of the first input data. For example, the predetermined portion may be determined based on a standard deviation $\sigma$ of a distribution of the first input data and may include a predetermined quantity, e.g., n, of standard deviation $\sigma$, such that $I_{upper} - I_{lower} \geq n\sigma$, where n may be any integer value (e.g., n=3, 4, 5, etc.) or fractional value (e.g., n=3.5, 4.4, etc.).

At block 1030, method 1000 may continue with the processing device identifying a second range of values associated with an integer number format. The second range of values may be a target range of values $[I_1, I_2]$ intended to be used for storing the first input data. For example, the second range of values may be associated with an 8-bit integer format (e.g., the target range of [0, 255] or [−128, 127], and the like) or a 16-bit integer format (e.g., a target range [0, 65536] or [−32768, 32767], and the like). In some implementations, the target integer format may be a format used to store weights of the first neuron layer of the MLM (e.g., the format of weights selected for the MLM during quantization of the MLM performed by the training server).

At block 1040, the processing device performing method 1000 may determine a scaling factor for the input data and obtain a first rescaled input data by rescaling the first input data based on a mapping of the first range of values to the second range of values. For example, the mapping may transform the end points according to $I_{lower} \rightarrow I_1$ and $I_{upper} \rightarrow I_2$ and may transform other points accordingly (e.g., in a proportional way). The scaling factor (or the inverse scaling factor) may be stored for subsequent use. At block 1050, method 1000 may continue with processing the first rescaled input data using a first neuron layer of the MLM to obtain a first intermediate data (e.g., an output of the first layer). At block 1060, method 1000 may include obtaining, using the first intermediate data, a first inference output of the MLM. The first inference output may include a first classification of the first input data. For example, the first classification may include identification of a person whose voice is represented by the first input data (in the instances of voice recognition), identification of words spoken by a person (in the instances of speech recognition), recognition of an object (in the instance of object identification), and the like.

As depicted with a callout portion in FIG. 10, obtaining the first inference output of the MLM may involve additional operations, including but not limited to processing of the output of the first layer of neurons (the first intermediate output) by additional layers of neurons. More specifically, at block 1062, method 1000 may include identifying a third range of values associated with the first intermediate data, e.g., the range of values $[J_{lower}, J_{upper}]$, which may be identified similarly to the range of values $[I_{lower}, I_{upper}]$ associated with the first input data (data input into the first layer of neurons). At block 1064, method 1000 may include identifying a fourth range of values associated with an integer number format of the first intermediate data. For example, the fourth range of values may be another target range of values $[J_1, J_2]$. In some implementations, the target range of values $[J_1, J_2]$ may be associated with an integer format used to store weights of the second neuron layer of the MLM, e.g., the format of weights of the second neuron layer selected for the MLM during quantization of the MLM performed by the training server. The range of values $[J_1, J_2]$ may be the same as the range of values $[I_1, I_2]$. In some implementations, the range of values $[J_1,J_2]$ may be different from the range of values $[I_1, I_2]$.

At block 1066, method 1000 may include determining a second scaling factor for the first intermediate data and obtaining a second rescaled input data by rescaling the first intermediate data based on a mapping of the third range of values to the fourth range of values (e.g., using $J_{lower} \to J_1$ and $I_{upper} \to J_2$). At block 1068, method 1000 may include processing the second rescaled input data using the second neuron layer of the MLM to obtain a second intermediate data (e.g., output of the second layer of neurons). This process may continue with the processing device using the second intermediate output to obtain (e.g., using third, fourth, etc., layers of neurons) the first inference output of the MLM.

Numerous variations of method 1000 may be implemented. For example, while in some implementations, the input data and the intermediate data is rescaled (quantized), in other implementations, both the input/intermediate data and the parameters of the MLM may be resealed. For example, the parameters of the MLM may be stored in one integer number format (or even in a floating-point format), e.g., after the quantization performed on the training server, but may be resealed to another integer number format together with the input or intermediated data.

It should be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The implementations of methods, hardware, software, firmware or code set forth above may be implemented via instructions or code stored on a machine-accessible, machine readable, computer accessible, or computer readable medium which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, implementation, and/or other exemplarily language does not necessarily refer to the same implementation or the same example, but may refer to different and distinct implementations, as well as potentially the same implementation.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

The invention claimed is:

1. A method to deploy a machine learning model (MLM), the method comprising:
    obtaining configuration settings of a pre-trained MLM, wherein the configuration settings of the MLM comprise:
        an information characterizing a flow of data associated with the MLM, and
        parameters of computational operations associated with the MLM;
    obtaining a hardware configuration of a target computing device; and
    compiling, in view of the configuration settings of the MLM and the hardware configuration of the target computing device, an execution package configured to execute the MLM on the target computing device, wherein compiling the execution package comprises:
        identifying a format of vectorized instructions of the processor of the target computing device; and
        generating a source code implementing the MLM on the target computing device, in view of the identified format of the vectorized instructions.

2. The method of claim 1, wherein the execution package comprises:
    a source code configured to execute the MLM on the target computing device; and
    a configuration file linked to the source code and defining execution of one or more operations of the source code.

3. The method of claim 1, further comprising:
communicating the execution package to the target computing device.

4. The method of claim 1, further comprising:
providing, to a user, at least a portion of the execution package; and
receiving, from the user, updated configuration settings of the MLM.

5. The method of claim 1, wherein the hardware configuration comprises at least one of:
characteristics of a processor on the target computing device, or
characteristics of a memory device of the target computing device.

6. The method of claim 1, wherein compiling the execution package further comprises:
identifying one or more kernels of the MLM, a dimension of each of the one or more kernels being different than a dimension of the vectorized instructions of the processor of the target computing device; and
modifying the one or more kernels of the MLM to align the dimension of each of the one or more kernels with the dimension of the vectorized instructions.

7. The method of claim 1, wherein the execution package is configured to execute operations comprising:
loading a first portion of the MLM, the first portion comprising a first plurality of parameters of the MLM, to a first memory component of the target computing device from a second memory component of the target computing device,
performing a first plurality of operations of the MLM using the first plurality of parameters of the MLM, and
loading a second portion of the MLM, the second portion comprising a second plurality of parameters of the MLM, to the first memory component of the target computing device, wherein loading the second portion of the MLM comprises replacing, in the second memory component, at least a subset of the first plurality of parameters of the MLM with a subset of the second plurality of parameters of the MLM.

8. A method to deploy a machine learning model (MLM), the method comprising:
instantiating, on an edge computing device (ECD), a MLM using an execution package generated in view of a hardware configuration of the ECD, wherein the hardware configuration comprises at least one of:
characteristics of a processor of the ECD, or
characteristics of a first memory device of the ECD; and
processing inference data, using the instantiated MLM, to obtain an inference output, wherein processing the inference data comprises:
loading a first portion of the MLM, the first portion comprising a first plurality of parameters of the MLM, to the first memory device of the ECD from a second memory device of the ECD,
performing a first plurality of operations of the MLM using the first plurality of parameters of the MLM, and
loading a second portion of the MLM, the second portion comprising a second plurality of parameters of the MLM, to the first memory device of the ECD, wherein loading the second portion of the MLM comprises replacing, in the second memory device of the ECD, at least a subset of the first plurality of parameters of the MLM with a subset of the second plurality of parameters of the MLM.

9. The method of claim 8 further comprising:
performing a second plurality of operations of the MLM using the second plurality of parameters of the MLM; and
obtaining the inference output using a first output of the first plurality of operations of the MLM and a second output of the second plurality of operations of the MLM.

10. The method of claim 8, wherein the execution package comprises:
a source code configured to execute the MLM on the ECD; and
a configuration file linked to the source code and defining execution of at least one operation of the source code.

11. The method of claim 8, wherein processing the inference data further comprises:
applying a first kernel to a first portion of the inference data;
applying a second kernel to a second portion of the inference data, wherein the second kernel is obtained by truncating the first kernel to a size of the second portion of the inference data.

12. The method of claim 11, wherein the second portion of the inference data is abutting a boundary of the inference data.

13. The method of claim 8, wherein processing the inference data further comprises:
applying one or more kernels of the MLM, a dimension of each of the one or more kernels being aligned with a dimension of vectorized instructions of a processor of the ECD.

14. The method of claim 13, wherein a first kernel of the one or more kernels comprises a padding, a number of bits of the padding determined to align a dimension of the first padding with the dimension of the vectorized instructions.

15. A system comprising:
a memory subsystem; and
a processing device communicatively coupled to the memory subsystem, the processing device configured to:
obtain configuration settings of a pre-trained MLM, wherein the configuration settings of the MLM comprise:
an information characterizing a flow of data associated with the MLM, and
parameters of computational operations associated with the MLM;
obtain a hardware configuration of a target computing device; and compile, in view of the configuration settings of the MLM and the hardware configuration of the target computing device, an execution package configured to execute the MLM on the target computing device, wherein to compile the execution package, the processing device is configured to:
identifying a format of vectorized instructions of the processor of the target computing device; and
generate a source code implementing the MLM on the target computing device, in view of the identified format of the vectorized instructions.

16. The system of claim 15, wherein the execution package comprises:
a source code configured to execute the MLM on the target computing device; and
a configuration file linked to the source code and defining execution of one or more operation of the source code.

17. The system of claim 15, wherein the processing device is further configured to:

provide, to a user, at least a portion of the execution package; and receive, from the user, updated configuration settings of the MLM.

18. The system of claim 15, wherein the hardware configuration comprises at least one of:
   characteristics of a processor on the target computing device, or
   characteristics of a memory device of the target computing device.

19. The system of claim 18, wherein to compile the execution package the processing device is further configured to:
   identify one or more kernels of the MLM, a dimension of each of the one or more kernels being different than a dimension of the vectorized instructions of the processor of the target computing device; and
   modify the one or more kernels of the MLM to align the dimension of each of the one or more kernels with the dimension of the vectorized instructions.

20. The system of claim 15, wherein the execution package is configured to cause a processing device of the target computing device to:
   load a first portion of the MLM, the first portion comprising a first plurality of parameters of the MLM, to a first memory component of the target computing device from a second memory component of the target computing device,
   perform a first plurality of operations of the MLM using the first plurality of parameters of the MLM, and
   load a second portion of the MLM, the second portion comprising a second plurality of parameters of the MLM, to the first memory component of the target computing device, wherein loading the second portion of the MLM comprises replacing, in the second memory component, at least a subset of the first plurality of parameters of the MLM with a subset of the second plurality of parameters of the MLM.

* * * * *